US012779909B2

(12) United States Patent
Amimoto et al.

(10) Patent No.: US 12,779,909 B2
(45) Date of Patent: Nov. 3, 2026

(54) PNEUMATIC TIRE

(71) Applicant: Toyo Tire Corporation, Itami (JP)

(72) Inventors: Hiroki Amimoto, Itami (JP); Yoshiki Sato, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 19/085,080

(22) Filed: Mar. 20, 2025

(65) Prior Publication Data

US 2025/0296389 A1 Sep. 25, 2025

(30) Foreign Application Priority Data

Mar. 22, 2024 (JP) ................................ 2024-046509

(51) Int. Cl.

*B60C 11/12* (2006.01)
*B60C 11/03* (2006.01)
*B60C 11/13* (2006.01)

(52) U.S. Cl.

CPC ........ *B60C 11/0306* (2013.01); *B60C 11/032* (2013.01); *B60C 11/1204* (2013.01); *B60C 11/1236* (2013.01); *B60C 11/1392* (2013.01)

(58) Field of Classification Search

CPC ............. B60C 11/1392; B60C 11/1236; B60C 11/0302; B60C 11/032; B60C 2011/0381; B60C 11/0306

See application file for complete search history.

(56) References Cited

U.S. PATENT DOCUMENTS

2002/0053382 A1* 5/2002 Mori ...................... B60C 11/13 152/209.9
2003/0226629 A1* 12/2003 Kimishima ......... B60C 11/0306 152/209.18

FOREIGN PATENT DOCUMENTS

EP 0547019 A1 * 6/1993 ......... B60C 11/0309
JP H07-040713 A * 2/1995
JP 2003-205710 A 7/2003
JP 2021-112999 A 8/2021
WO WO-2024041706 A1 * 2/2024 ......... B60C 11/0302

OTHER PUBLICATIONS

English machine translation of EP-0547019-A1 (Year: 1993).*
English machine translation of WO-2024041706-A1 (Year: 2024).*
English machine translation of JPH07-040713-A (Year: 1995).*

* cited by examiner

*Primary Examiner* — Robert C Dye
(74) *Attorney, Agent, or Firm* — WHDA, LLP

(57) ABSTRACT

A tire includes a tread having a plurality of grooves and a plurality of lands. The ground contacting surfaces of at least some of the lands have sipes that are formed like thin lines when viewed from the outside in the tire radial direction, and a groove is provided with an end edge at a position within 10 mm of the sipe, the end edge being connected to a round chamfer arc-shaped in cross section.

7 Claims, 20 Drawing Sheets

PNEUMATIC TIRE

CROSS REFERENCE TO RELATED APPLICATION

The entire disclosure of Japanese Patent Application No. 2024-046509 filed on Mar. 22, 2024, including the specification, claims, drawings, and abstract is incorporated herein by reference in its entirety.

TECHNICAL FIELD

The present invention generally relates to a pneumatic tire and more specifically to a pneumatic tire with a tread including a plurality of lands.

BACKGROUND

JP 2003-205710 A describes that a sipe having one end opened to a main groove and the other end terminated in a block is formed on the surface of the block of a tread, and a corner of a block end edge on one side in the tire circumferential direction is cut off by a chamfer, the block end edge being formed by the sipe.

JP 2021-112999 A describes that a sipe penetrating a land of a tread in the tire axial direction is provided, and a flat or curved chamfer is formed on the top of the wall surface of the sipe.

In a pneumatic tire, a thin-line sipe may be formed on the surface of a land of a tread. However, an edge of the sipe has an edge shape, so that a pressure is likely to increase around the edge of the sipe on the ground contacting surface of the land when the tire comes into contact with the ground. Thus, uneven wear is likely to occur on the land in the early period. In particular, if vehicle weights are increased due to automotive electrification or the like and the output torque rises, uneven wear is more likely to occur in the early period.

When a chamfer is formed on the top of the wall surface of a sipe as described in JP 2003-205710 A and JP 2021-112999 A, the ground contacting surfaces of lands separated by the sipe are largely spaced from each other, so that the stiffness of the land is likely to decrease.

SUMMARY

It is an advantage of the present invention to provide a pneumatic tire that can suppress uneven wear in the early period on a land having a sipe, by dispersing a contact pressure on the ground contacting surface of the land while suppressing a reduction in the stiffness of the land.

A pneumatic tire according to the present invention is a pneumatic tire with a tread including a plurality of main grooves and a plurality of lands, wherein the ground contacting surfaces of at least some of the lands have sipes that are formed like thin lines when viewed from the outside in the tire radial direction, and a groove is provided with an end edge at a position within 10 mm of the sipe, the end edge being connected to a round chamfer arc-shaped in cross section.

The pneumatic tire according to the present invention can suppress an increase in pressure on edges around the sipes, on which a contact pressure is likely to increase, on the lands including the sipes. This can disperse a contact pressure on the ground contacting surface and thus suppress uneven wear in the early period. Moreover, the round chamfer does not need to be formed on the top of the wall surface of the sipe, thereby suppressing a reduction in the stiffness of the land.

BRIEF DESCRIPTION OF THE DRAWINGS

Embodiments of the present disclosure will be described based on the following figures, wherein.

DESCRIPTION OF EXEMPLARY EMBODIMENT

An exemplary embodiment of a pneumatic tire according to the present invention will be specifically described below with reference to the accompanying drawings. The embodiment is merely exemplary, and the present invention is not limited to the embodiment. Furthermore, selectively combining the constituent elements of the following embodiments and modification examples is included in the present invention.

Overall Configuration of Tire

Figure 1:
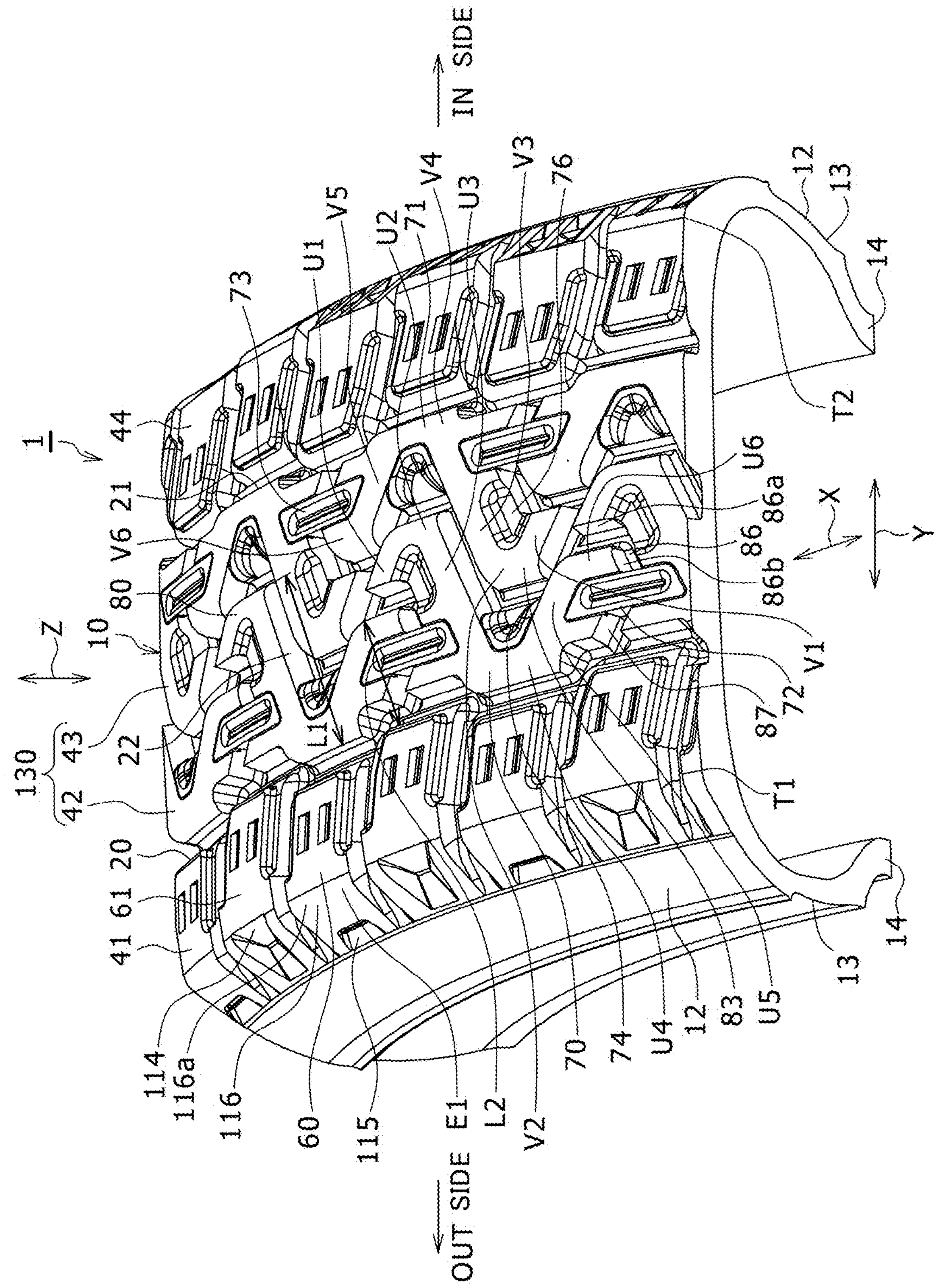
FIG. 1 is a perspective view illustrating a part of a pneumatic tire in the tire circumferential direction as an exemplary embodiment.
Figure 2:
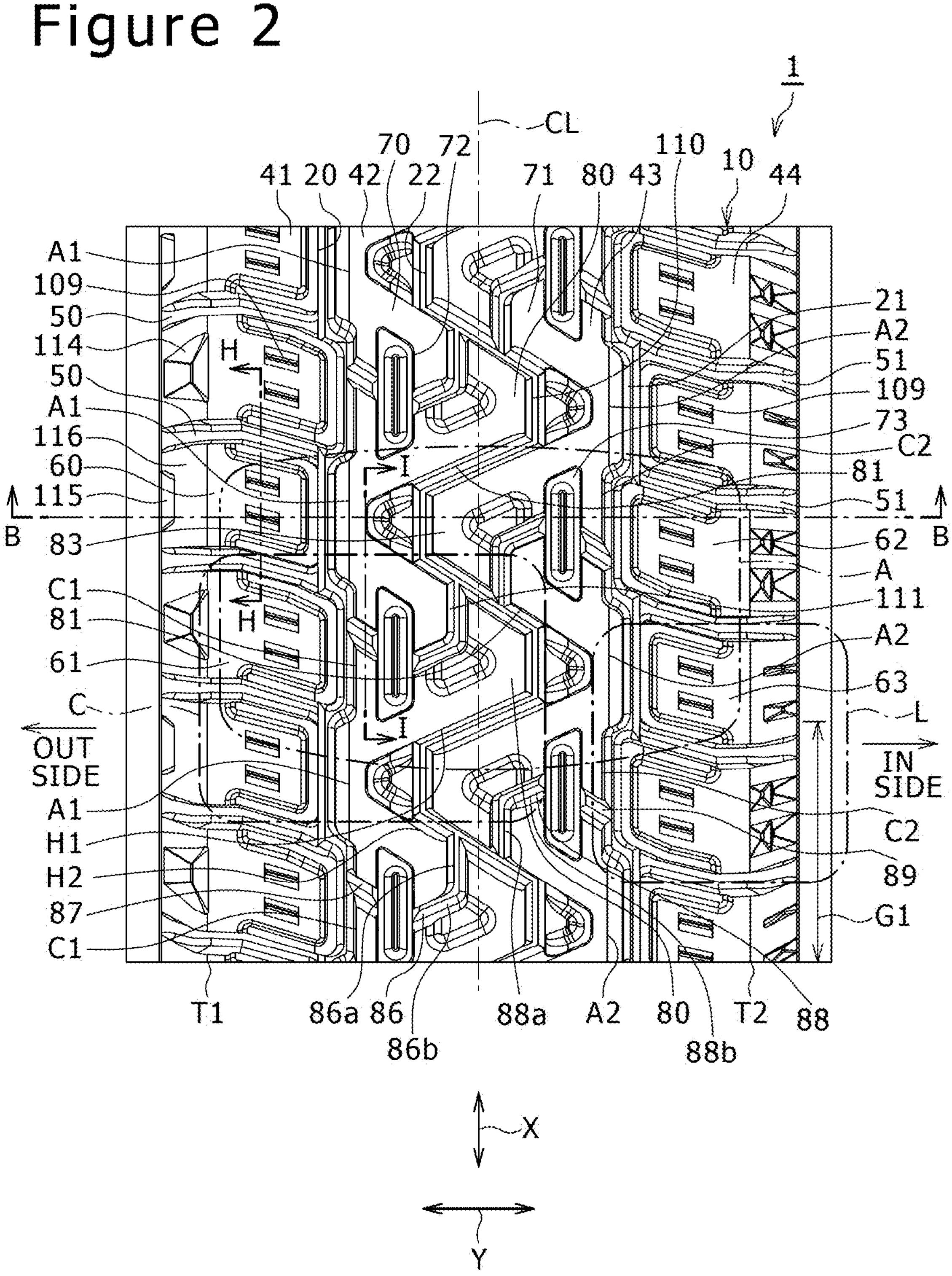
FIG. 2 is a plan view of the pneumatic tire shown in FIG. 1, illustrating a part of a tread in the circumferential direction.
Figure 3:
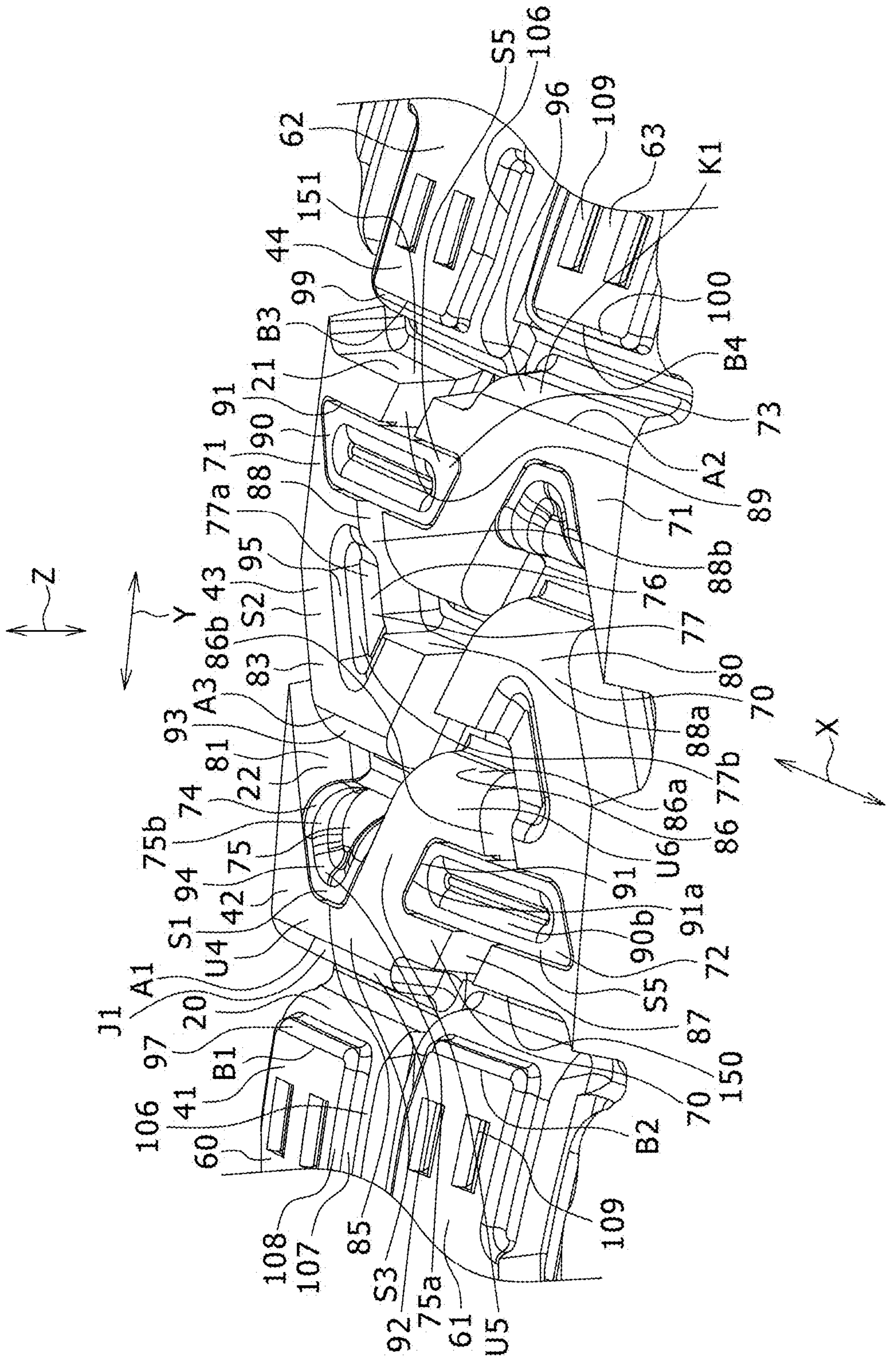
FIG. 3 is an enlarged perspective view of part A in FIG. 2.
Figure 4:
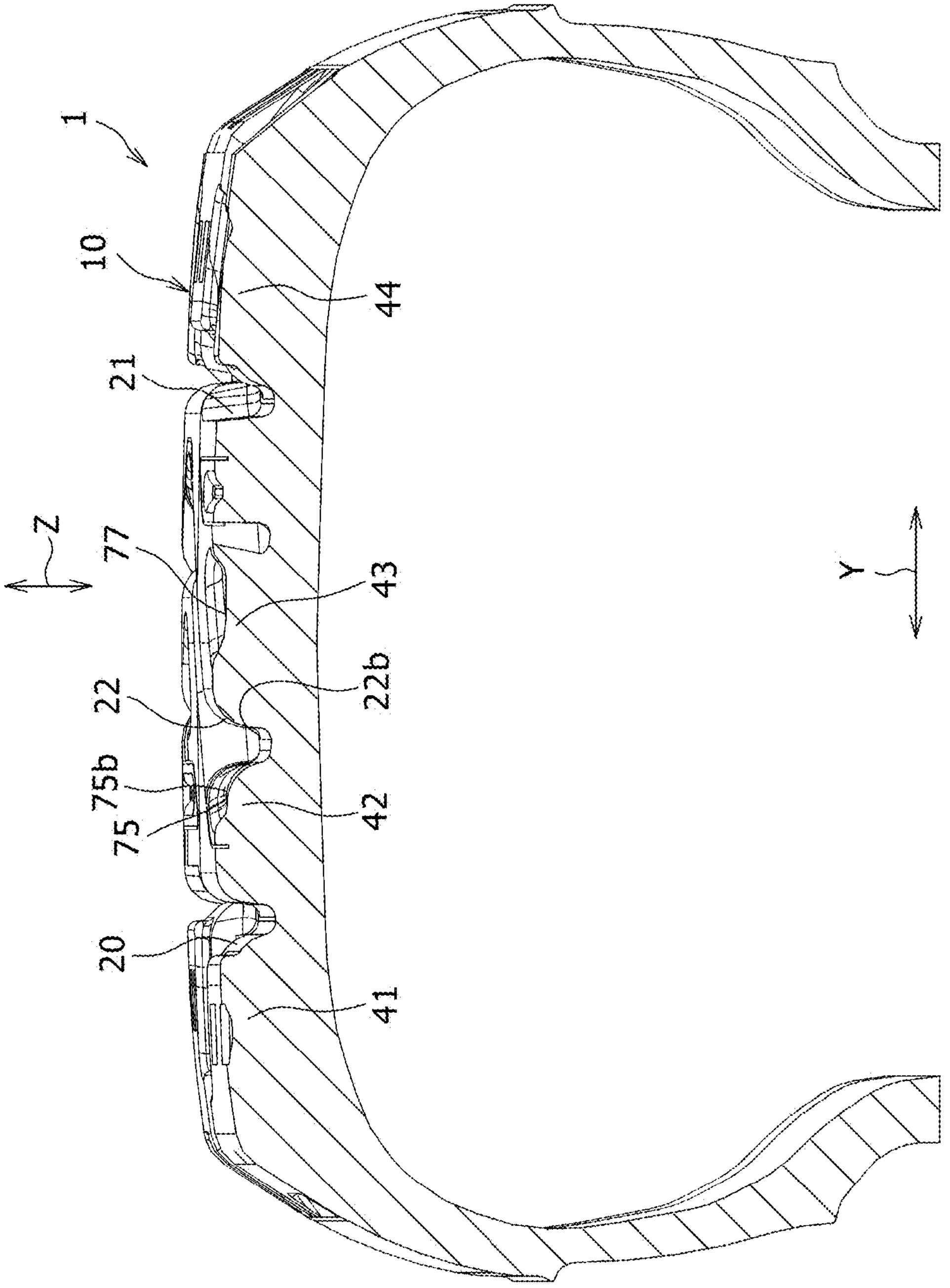
FIG. 4 is a cross-sectional view taken along line B-B of FIG. 2.
Figure 5:
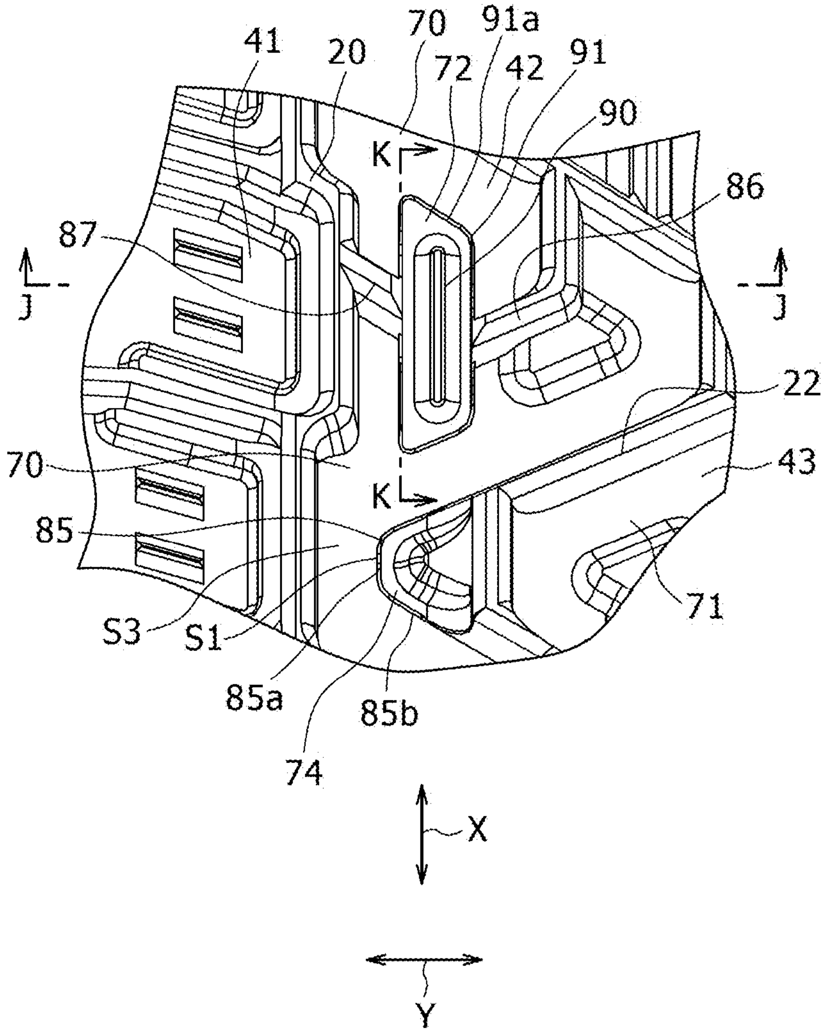
FIG. 5 is an enlarged view of part C in FIG. 2.
Figure 6A:
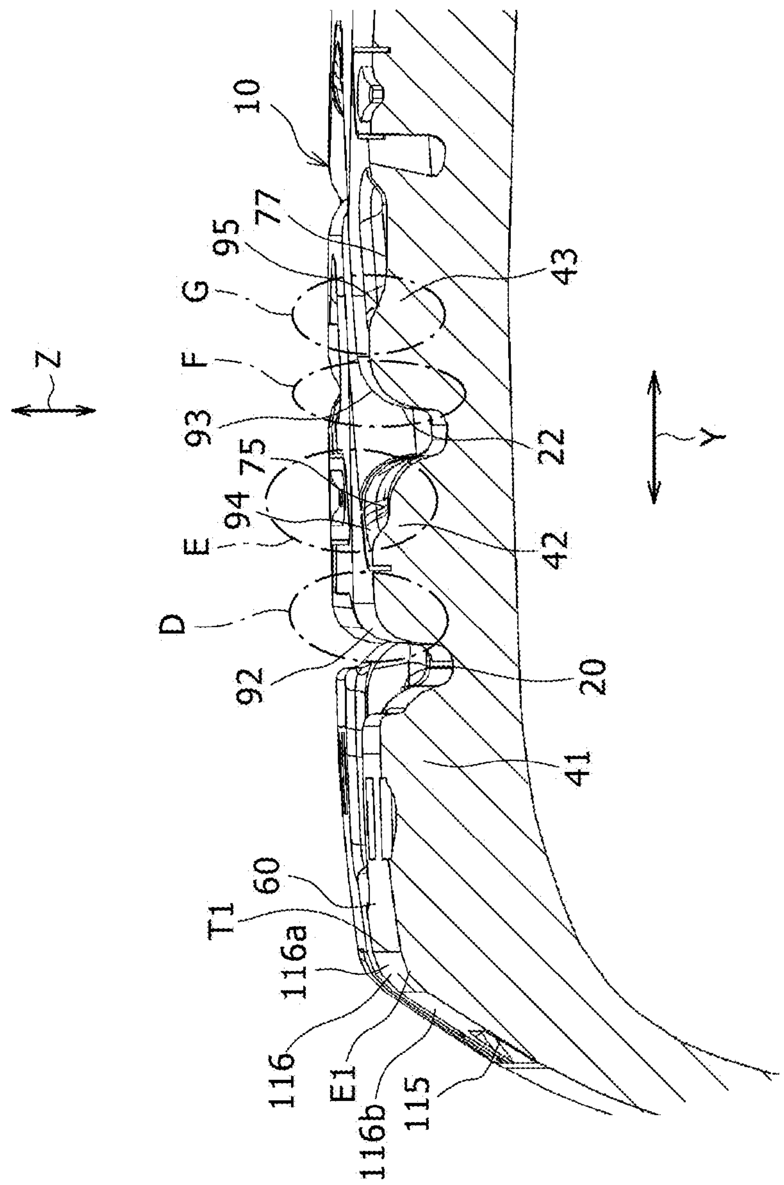
FIG. 6A is an enlarged view of the left half of FIG. 4.

FIG. 1 is a perspective view illustrating a part of a pneumatic tire 1 in the tire circumferential direction as an exemplary embodiment. FIG. 2 is a plan view of the pneumatic tire 1 shown in FIG. 1, illustrating a part of a tread 10 in the circumferential direction. FIG. 3 is an enlarged perspective view of part A in FIG. 2. FIG. 4 is a cross-sectional view taken along line B-B of FIG. 2. FIG. 5 is an enlarged view of part C in FIG. 2. FIG. 6A is an enlarged view of the left half of FIG. 4. As shown in FIGS. 1 to 6A, the pneumatic tire 1 includes the tread 10 that is a part that comes into contact with a road surface. Hereinafter, "pneumatic tire 1" will be referred to as "tire 1". The tread 10 has a tread pattern that includes multiple lands spaced apart in the tire axial direction and multiple grooves spaced apart in the tire axial direction, and is formed in a circular shape along the tire circumferential direction (in the vertical direction in FIGS. 1 and 2). In FIGS. 1 to 6A, the tire circumferential direction is indicated by arrow X, the tire axial direction is indicated by arrow Y, and the tire radial direction is indicated by Z.

In the example of FIG. 1, the tire 1 is mounted on a vehicle with the left side located on the outer side (OUT side) in the width direction of the vehicle and the right side located on the inner side (IN side) in the width direction of the vehicle. The IN side and the OUT side are specified thus. In reality, the mounting direction of each side of the tire 1 on the vehicle is not specified.

The tread 10 has a plurality of main grooves 20, 21, and 22 that are spaced in the tire axial direction and are provided around the tire. The main grooves 20, 21, and 22 include the pair of shoulder main grooves 20 and 21 provided closest to the ground contacting ends on both sides in the tire axial direction and the center main groove 22 provided between the pair of shoulder main grooves 20 and 21 in the tire axial direction. The tread 10 includes four lands 41, 42, 43, and 44 separated by the three main grooves 20, 21, and 22. The shoulder main grooves 20 and 21 extend circularly in the tire circumferential direction while curving slightly in the tire axial direction. The center main groove 22 extends circularly in the tire circumferential direction while curving in a zigzag.

The four lands 41, 42, 43, and 44 are protrusions that protrude outward from the reference plane of the tread 10 in the tire radial direction. "Reference plane" refers to a virtual plane extending along the bottoms of the main grooves 20, 21, and 22 having the largest depth, and means the outer periphery of the tread 10 in the absence of the lands 41, 42, 43, and 44. The shoulder main grooves 20 and 21 have nearly the same maximum depth as the center main groove 22 in the tire radial direction.

The four lands 41, 42, 43, and 44 include the shoulder land 41 provided outside the shoulder main groove 20 on the OUT side in the tire axial direction, the first inner land 42 provided between the shoulder main groove 20 and the center main groove 22, the second inner land 43 provided between the center main groove 22 and the shoulder main groove 21 on the IN side, and the shoulder land 44 provided outside the shoulder main groove 21 in the tire axial direction. With this configuration, the tread 10 includes the two shoulder lands 41 and 44 that are provided on both ends in the tire axial direction and the two inner lands 42 and 43 that are provided between the two shoulder lands 41 and 44 and are opposed to each other in the tire axial direction with the center main groove 22 interposed therebetween. The inner lands 42 and 43 are lands placed between the two shoulder lands 41 and 44 with the pair of shoulder main grooves 20 and 21, each being interposed between the inner land and the shoulder land. The center main groove 22 and the inner lands 42 and 43 are provided in such a manner as to cross a tire-axial-direction center CL (FIG. 2), which is a tire equator, in the tire axial direction. The inner lands 42 and 43 correspond to inner blocks.

The shoulder lands 41 and 44 are configured with shoulder blocks 60, 61, 62, and 63 that are separated at multiple positions in the tire circumferential direction by lug grooves 50 and 51 and are arranged in the tire circumferential direction. The shoulder blocks 60, 61, 62, and 63 are placed at positions including ground contacting ends T1 and T2. The inner lands 42 and 43 are shaped like ribs extending continuously around the tire in the tire circumferential direction by connecting a plurality of inner blocks 70 and 71 in the tire circumferential direction via a plurality of connecting ribs 72 and 73 extending in the tire circumferential direction.

The tire 1 includes side walls 12 that are provided outside the tread 10 in the tire axial direction and expand outward to the maximum extent in the tire axial direction, and beads 14 that are fixed to the rims of a wheel. The side wall 12 and the bead 14 are formed in a circular shape along the tire circumferential direction and constitute a tire side 13. The side walls 12 extend inward in the tire radial direction from both axial ends of the tread 10.

The tire 1 is a pneumatic tire filled with air at a predetermined pressure. The tread 10 and the side walls 12 are made of, for example, different kinds of rubber.

The shoulder lands 41 and 44 placed on both axial ends of the tread 10 include the ground contacting ends T1 and T2 that are ends located outside the ground contacting surface in the tire axial direction.

The ends of the shoulder lands 41 and 44 in the tire axial direction protrude outward from the ground contacting ends T1 and T2 in the tire axial direction and curve slightly inward in the tire radial direction such that the outer surfaces protrude outward. Portions protruding outward from the ground contacting ends T1 and T2 of the shoulder lands 41 and 44 in the tire axial direction are referred to as buttresses.

"Ground contacting ends T1 and T2" mean both ends of an area in the tire axial direction, the area coming into contact with a flat road surface when 70% of a normal load at an internal pressure is applied in a state in which the unused tire 1 is mounted on a regular rim and is filled with air to the normal internal pressure.

In this case, "regular rim" is a rim defined by the tire standards, and refers to "standard rim" in the JATMA, refers to "Design Rim" in the TRA, and refers to "Measuring Rim" in the ETRTO. "Normal internal pressure" refers to "maximum air pressure" in the JATMA, refers to the maximum value indicated in the table "TIRE LOAD LIMITS AT VARIOUS COLD INFLATION PRESSURES in the TRA, and refers to "INFLATION PRESSURE" in the ETRTO. "Normal load" refers to "maximum load capacity" in the JATMA, refers to the maximum value indicated in the table "TIRE LOAD LIMITS AT VARIOUS COLD INFLATION PRESSURES" in the TRA, and refers to "LOAD CAPACITY" in the ETRTO.

The tire 1 includes a carcass, a belt, and an inner liner. The carcass is a cord layer covered with rubber and forms the frame of the tire 1 that resists a load, an impact, and air pressure or the like. The belt is a reinforcing belt disposed between the rubber constituting the tread 10 and the carcass. The belt tightly fastens the carcass to increase the stiffness of the tire 1. The inner liner is a rubber layer that is provided on the inner surface of the carcass and maintains the air pressure of the tire 1. Furthermore, the bead 14 includes a bead core and a bead filler.

Configuration of Characteristic Portion of Tread

In the present embodiment, as shown in FIG. 2, the first inner land 42 has two first protrusions 80 that are spaced apart in the tire circumferential direction, protrude to the center main groove 22 in the tire axial direction, and have two V-shaped edges near the center main groove 22 on the ground contacting surface when viewed from the outside in the tire radial direction. The second inner land 43 has a second protrusion 83 that protrudes to the center main groove 22 in the tire axial direction, has a V-shaped edge near the center main groove 22 on the ground contacting surface, and is fitted into a first groove 81 of the center main groove 22, that is, a V-shaped portion between the two first protrusions 80 in the tire circumferential direction when viewed from the outside in the tire radial direction. The center main groove 22 is formed by alternately connecting the V-shaped first grooves 81, which are placed in different orientations in the tire axial direction, in the tire circumferential direction.

As shown in FIGS. 3 and 5, the tread 10 has a first rib 74 that protrudes outward in the tire radial direction so as to be connected to the inner side of a corner of the center main groove 22 and has a dimple 75 recessed from a ground contacting surface S1 on the outer surface in the tire radial direction, and a second rib 76 that protrudes outward in the tire radial direction as to be connected to the inner side of a corner of the second protrusion 83 and has a dimple 77 recessed from a ground contacting surface S2 on the outer surface in the tire radial direction. The dimples 75 and 77 correspond to shallow grooves. The first rib 74 corresponds to a second block. This can increase traction performance in the tire circumferential direction and suppress partial wear in early period on a dry road surface.

Specifically, an inner block 70 constituting the first inner land 42 is formed into a shape including an inverted letter S by alternately connecting a plurality of tilt portions U1, U3, and U5 that tilt in the tire circumferential direction and a plurality of circumferential portions U2, U4, and U6 that extend in the tire circumferential direction. The inverted letter S is the shape of a letter S viewed from the back side. The circumferential portions U2, U4, and U6 include an end circumferential portion U6 provided on one end of the inner block 70 in the tire circumferential direction. The end circumferential portion U6 is disposed between both tire axial ends of the inner block 70 in the tire axial direction. In the present example, the first inner land 42 and the second inner land 43 have shapes that are inverted from each other in the tire axial direction and the tire circumferential direction, are displaced from each other by a half pitch in the tire circumferential direction, and are disposed in engagement with each other when viewed from the outside in the tire radial direction. The inner lands 42 and 43 are formed by repeating the partial tire circumferential shapes around the tire in the tire circumferential direction.

Thus, the inner block 71 constituting the second inner land 43 is formed like a letter S by alternately connecting a plurality of tilt portions V1, V3, and V5 that tilt in the tire circumferential direction, and a plurality of circumferential portions V2, V4, and V6 that extend in the tire circumferential direction, in the inverse order from the inner block 70 in the tire circumferential direction. The circumferential portions V2, V4, and V6 include an end circumferential portion V6 provided on the other end of the inner block 71 in the tire circumferential direction. The end circumferential portion V6 is disposed between both tire axial ends of the inner block 71 in the tire axial direction.

On the ends of the ground contacting surfaces of the tilt portions U1, U3, U5, V1, V3, and V5, a portion connecting to the wall surface of the center main groove 22 is kept angular without being chamfered. On the ends of the contact areas of the circumferential portions U2, U6, V2, and V6, a portion connecting to the wall surface of the center main groove 22 is chamfered into an arc in cross section, as will be described later.

The corner where the first rib 74 is provided is substantially V-shaped when viewed from the outside in the tire radial direction, and the first rib 74 is provided at the back of the corner. Thus, in the center main groove 22, a portion provided inside the corner has a U shape that extends to separate from the first rib 74 and is configured with tilt portions U3 and U5 tilting in opposite directions in the tire circumferential direction and a circumferential portion U4 connecting ends of the tilt portions U3 and U5 and extending in the tire circumferential direction.

As shown in FIG. 3, the first rib 74 has the substantially U-shaped ground contacting surface S1 as the top face, has a wall surface 75*a* including a substantially U-shaped inclined surface and a bottom 75*b* connected to the bottom side of the wall surface 75*a*, and has the dimple 75 recessed inward in the tire radial direction. A dimple depth d1 from the ground contacting surface S1 to the bottom 75*b* is 50% or less of a maximum depth d2 of the center main groove 22. For example, the dimple depth d1 is equal to or greater than 15% and equal to or less than 20% of the maximum depth d2 of the center main groove 22. As shown in FIG. 4, the bottom 75*b* of the dimple 75 and a bottom 22*b* of the center main groove 22 are smoothly connected by a curved surface substantially arc-shaped in cross section.

Furthermore, as shown in FIGS. 3 and 5, in the first inner land 42, a fine-line sipe 85 is formed between the U-shaped ground contacting surface S1 of the first rib 74 and an edge of the ground contacting surface S3 at the corner of the first inner land 42, the edge being located near the center main groove 22, the sipe 85 being substantially U-shaped when viewed from the outside in the tire radial direction. Both ends of the sipe 85 are opened to the center main groove 22. The sipe 85 has a minimum depth around the center of a circumferential portion 85*a* extending in the tire circumferential direction at the intermediate portion of the sipe 85 and has a maximum depth at leg portions 85*b* extending to be spaced apart from each other on both ends toward the center main groove 22. The inner block 70 corresponds to a first block. The inner block 70 is a corner surrounding the first rib 74 of the first inner land 42 and includes a U shape on the opposite side from the first rib 74 with respect to the sipe 85.

The second rib 76 is provided inside a corner of the second protrusion 83 in the inner block 71 of the second inner land 43. The second protrusion 83 is substantially J-shaped when viewed from the outside in the tire radial direction, extends toward the IN side that is one side in the tire axial direction, and is configured with the tilt portions V1 and V3 tilting in opposite directions in the tire circumferential direction, with the circumferential portion V2 connecting ends of the tilt portions V1 and V3 and extending in the tire circumferential direction.

As shown in FIG. 3, the inner block 70 has one longitudinal end on one side in the tire circumferential direction and a longitudinal end adjacent to one side in the tire circumferential direction such that the ends face each other, while a circumferential portion 86*a* of a V-shaped lug groove 86 is interposed between the ends, the circumferential portion 86*a* extending in the tire circumferential direction. One end of the circumferential portion 86*a* is connected to the center main groove 22, and the other end of the circumferential portion 86*a* is connected to a tilt portion 86*b* of the lug groove 86, the tilt portion 86*b* tilting in the tire circumferential direction. The tilt portion 86*b* faces a linear lug groove 87 in the tire axial direction, which tilts reversely in the tire circumferential direction, while a tire-circumferential intermediate portion of a connecting rib 72 is interposed between the tilt portion 86*b* and the lug groove 87. The connecting rib 72 corresponds to a second block.

As shown in FIG. 3, the second rib 76 is shaped with the dimple 77 recessed from the ground contacting surface S2, which is the top face of a corner of the second protrusion 83, in the tire radial direction. The dimple 77 is shaped like a triangle with a portion removed near one corner of the triangle when viewed from the outside in the tire radial direction. A portion around a bottom 77*a* of the dimple 77 and the ground contacting surface S2 of the second protrusion 83 are connected via a wall surface 77*b* including an inclined surface along the circumferential edge of the bottom 77*a*. The wall surface 77*b* and the ground contacting surface S2 are connected via a dimple round chamfer 95, which is a curved surface like an arc in cross section. The dimple 77 is opened to the other end of a circumferential portion 88*a* of a V-shaped lug groove 88 in the tire circumferential direction and a tilt portion 88*b*. The depth of the dimple 77 can be set at, for example, equal to or greater than 5% and equal to or less than 50% of the maximum depth of the center main groove 22. The bottom 77*a* of the dimple 77 is connected to the wall surface of the lug groove 88.

The connecting rib 72 that connects the inner block 70 protrudes outward in the tire radial direction so as to extend in the tire circumferential direction. The connecting rib 72 is shaped like a trapezoid with an outer side longer than an inner side in the tire axial direction when viewed from the outside in the tire radial direction. The height of a ground contacting surface S5 as the top face is nearly equal to the height of a ground contacting surface S3 of the inner block 70. Both ends of the connecting rib 72 in the tire circumferential direction are connected to the two inner blocks 70 while being placed inward in the inner blocks 70 from the wall surfaces of the two inner blocks 70 that are adjacent to each other in the tire circumferential direction, the wall surfaces facing the tire circumferential direction. Furthermore, a dimple 90 is provided inside the ground contacting surface S5 of the connecting rib 72, the dimple 90 extending in the tire circumferential direction and being recessed inward in the tire radial direction. The dimple 90 has a wall surface 90*a* shaped like an oval extending in the tire circumferential direction when viewed from the outside in the tire radial direction, and a dimple round chamfer 90*b* that is arc-shaped in cross section on top of an inclined surface around the dimple 90 with respect to the ground contacting surface S5 of the connecting rib 72. The connecting rib 72 that connects the adjacent inner blocks 70 has been described above. A connecting rib 73 (FIGS. 2 and 3) that connects the adjacent inner blocks 71 is identical to the connecting rib 72 except that the connecting rib 73 has a shape inverted from that of the connecting rib 72 in the tire circumferential direction and the tire axial direction when viewed from the outside in the tire radial direction.

Furthermore, on the ground contacting surfaces of the inner lands 42 and 43, a fine-line sipe 91 is formed between the ground contacting surface S5 of the connecting ribs 72 and 73 and the ground contacting surfaces S3 and S2 of the inner blocks 70 and 71, the sipe 91 being substantially U-shaped when viewed from the outside in the tire radial direction. Both ends of the sipe 91 are opened to the tilt portions 86*b* and 88*b* of the V-shaped lug grooves 86 and 88, the lug groove 87, and a lug groove 89. The sipe 91 has a minimum depth at portions connecting to the lug grooves 86 and 87, gradually increases in depth toward the rear ends of the inner blocks 70 and 71, and has a maximum depth in a tilt portion 91*a* that tilts linearly on the rear ends of the inner blocks 70 and 71 in the tire axial direction.

Configuration and Effect of Rib Inside Corner

As described above, the first rib 74 and the second rib 76 that protrude outward in the tire radial direction are connected to the inner sides of corners at both of the V-shaped first groove 81 and the second protrusion 83 placed into the first grooves 81, thereby increasing stiffness around the corners. This can suppress leaning of the corners and reduce uneven wear. Thus, at the corners, the edge effect is more likely to be obtained by the angular end edges of the tilt portions U3, U5, V1, and V3 that tilt in the tire circumferential direction and face the center main groove 22, thereby increasing traction performance in the tire circumferential direction.

The ribs 74 and 76 have the dimples 75 and 77 recessed from the ground contacting surfaces on the outer surfaces in the tire radial direction. Thus, when the corners come into contact with a dry road surface, a concentrated contact pressure around the end edge of the ground contacting surface can be suppressed, thereby reducing partial wear in the early period. Although the recessed shapes formed from the ground contacting surfaces S1 and S2 tend to reduce stiffness, the reinforcement by the ribs 74 and 76 can compensate for the reduced stiffness. This can suppress a large change around the ground contacting surfaces S1 and S2 when the tire comes into contact with the ground. In this way, partial wear in the early period can be suppressed also by increasing stiffness around the corners. This can further improve handling and traction performance on a dry road surface and suppress partial wear in the early period.

The dimples 75 and 77 formed in the ribs 74 and 76 are opened to the center main groove 22 or the lug grooves 86 and 88 connected to the center main groove 22. Thus, rainwater entering between the ground contacting surface of the tire and a road surface when driving in the rain can be passed to the rear side of the tire in the traveling direction from the dimples 75 and 77 through the center main groove 22 or the lug grooves 86 and 88 at a larger depth. This can increase the drainage of the tire.

Furthermore, as shown in FIGS. 3 and 6A, on the first inner land 42 and the second inner land 43, corner-outer round chamfers 92 and 93 that are arc-shaped in cross section are connected to end edges A1 and A3 along the tire circumferential direction on the ground contacting surface, the edges being located on the outer side of the corner, that is, on the opposite side of the ground contacting surface from the inner side of each corner.

Figure 6B:
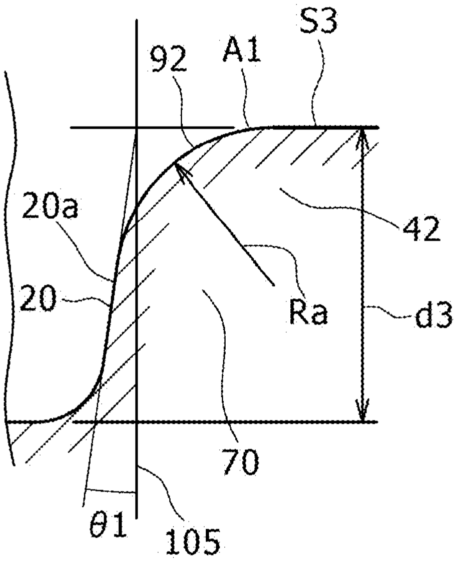
FIG. 6B is an enlarged view of part D in FIG. 6A.

FIGS. 6B, 6C, 6D, and 6E are an enlarged view of part D, an enlarged view of part E, an enlarged view of part F, and enlarged view of part G in FIG. 6A. As shown in FIG. 6B, the corner-outer round chamfer 92 of the first inner land 42 is a portion connected to the ground contacting surface S3 of the inner block 70 and a main-groove round chamfer formed on top of a wall surface 20*a* near the tire-axial-direction center CL constituting the shoulder main groove 20. The corner-outer round chamfer 92 corresponds to a first corner-outer round chamfer and a second round chamfer.

Figure 6C:
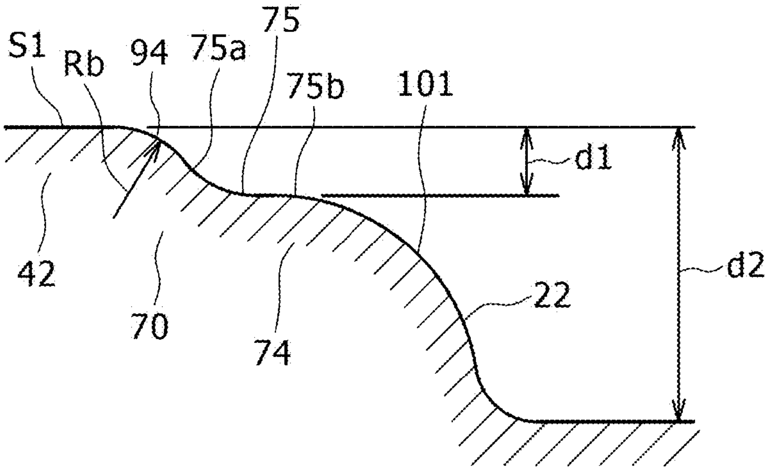
FIG. 6C is an enlarged view of part E in FIG. 6A.
Figure 6D:
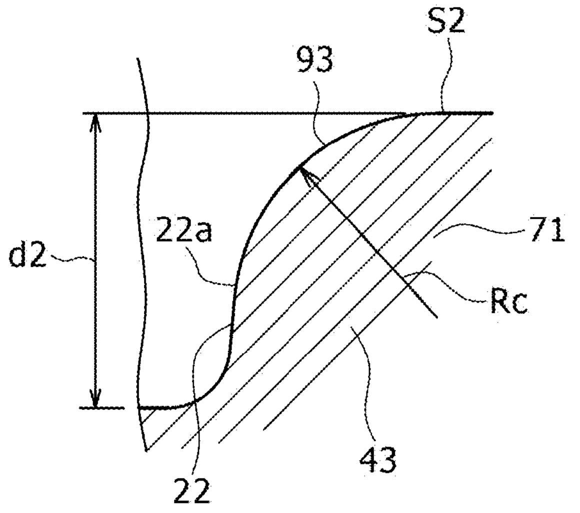
FIG. 6D is an enlarged view of part F in FIG. 6A.

As shown in FIG. 6D, the corner-outer round chamfer 93 of the second inner land 43 is a portion connected to the ground contacting surface S2 of the inner block 71 and a main-groove round chamfer formed on top of a wall surface 22*a* constituting the center main groove 22. The corner-outer round chamfer 93 of the second inner land 43 corresponds to a second corner-outer round chamfer and a second round chamfer. This can further reduce early period wear occurring around the end edge along the tire circumferential direction, compared with the case where the outer side of the corner is not chamfered.

As shown in FIGS. 3, 6A, 6C, and 6E, dimple round chamfers 94 and 95 that are arc-shaped in cross section are formed on top of the wall surfaces 75*a* and 77*b* forming the dimples 75 and 77 of the ribs 74 and 76. The dimple round chamfers 94 and 95 correspond to shallow-groove round chamfers. This configuration can also suppress a concentrated contact pressure on the end edge of the ground contacting surface of the tire, thereby further suppressing wear in early period occurring around the end edge of the ground contacting surface of the tire.

Figure 6E:
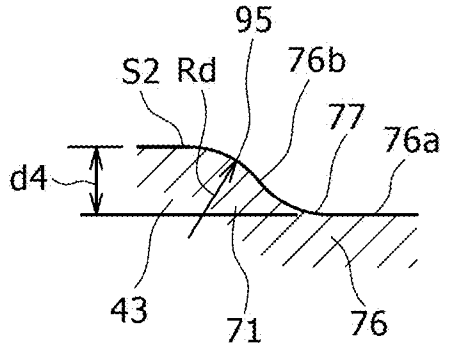
FIG. 6E is an enlarged view of part G in FIG. 6A.

As shown in FIGS. 6B and 6C, a curvature radius Ra of the corner-outer round chamfer 92 of the first inner land 42 is larger than a curvature radius Rb of the dimple round chamfer 94 of the first rib 74. As shown in FIGS. 6D and 6E, a curvature radius Rc of the corner-outer round chamfer 93 of the second inner land 43 is larger than a curvature radius Rd of the dimple round chamfer 95 of the second rib 76. Thus, if the wall surfaces of the inner lands 42 and 43 are deformed when the tire comes into contact with the ground, rubber can be properly compressed while suppressing deformation to the inside of the groove of the wall surface according to a maximum depth d3 and the maximum depth d2 of the shoulder main groove 20 and the center main groove 22 or the dimple depth d1 or a dimple depth d4. This can effectively suppress an increase in pressure on the edges of the ground contacting surfaces of the inner lands 42 and 43. Thus, a contact pressure on the ground contacting surface can be dispersed, thereby increasing the effect of suppressing wear in the early period.

Furthermore, referring to FIGS. 6B and 6D, the curvature radius Ra of the corner-outer round chamfer 92 of the first inner land 42 is smaller than the curvature radius Rc of the corner-outer round chamfer 93 of the second inner land 43.

Configuration and Effect of Chamfering on Both Sides of Shoulder Main Groove

Furthermore, in the embodiment, round chamfers that are arc-shaped in cross section are connected to at least a tire-circumferential part of the end edge A1 and an edge A2 that are located on the ends of the ground contacting surfaces of the inner lands 42 and 43 near the shoulder main grooves 20 and 21 in the tire axial direction, and extend along the tire circumferential direction, and end edges that are located on the ends of the ground contacting surfaces of the shoulder lands 41 and 44 near the shoulder main grooves 20 and 21 in the tire axial direction and extend along the tire circumferential direction.

For example, as shown in FIGS. 3 and 6B, the end edge A1 of the ground contacting surface of the first inner land 42 near the shoulder main groove 20 extends along the tire circumferential direction, and the corner-outer round chamfer 92 that is arc-shaped in cross section is connected to the end edge A1. Furthermore, as shown in FIG. 3, the end edge A2 of the ground contacting surface of the second inner land 43 near the shoulder main groove 21 extends along the tire circumferential direction, and a round chamfer 96 that is arc-shaped in cross section is connected to the end edge A2. The end edges A1 and A2 correspond to a first circumferential edge. The intermediate portions of the inner lands 42 and 43 in the height direction near the shoulder main grooves 20 and 21 are inclined surfaces that tilt outward in the tire axial direction toward the outside in the tire radial direction as shown in FIG. 6B illustrating the wall surface 20*a* of the inner land 42. The intermediate portion of the wall surface 20*a* tilts at, for example, a predetermined angle θ1 equal to or smaller than 10° with respect to a virtual plane 105 extending along the tire radial direction. The corner-outer round chamfer 92 is formed to be connected to the inclined intermediate portion of the wall surface 20*a* on top of the wall surface 20*a*.

Furthermore, as shown in FIG. 3, end edges B1 and B2 of the ground contacting surfaces of the shoulder blocks 60 and 61 constituting the shoulder land 41 near the main groove extend along the tire circumferential direction, and round chamfers 97 and 98 that are arc-shaped in cross section are connected to at least part of the edges in the tire circumferential direction. The end and the wall surface of the ground contacting surface of the shoulder block 61 near the shoulder main groove 20 are located closer to the tire-axial-direction center CL than the end and the wall surface of the ground contacting surface of the shoulder block 60 near the shoulder main groove 20. Accordingly, the wall surface of the first inner land 42 opposed to the shoulder block 61 is located closer to the tire-axial-direction center CL than the wall surface of the first inner land 42, the wall surface being opposed to the shoulder block 60. Thus, the wall surface of the first inner land 42 near the shoulder main groove 20 is shaped such that first land ends J1 and recesses 150 are alternately arranged in the tire circumferential direction, the recesses 150 being indented from the wall surface of the first land end J1 in the tire axial direction, the wall surface facing outward in the tire axial direction. Likewise, the wall surface of the second inner land 43 near the shoulder main groove 21 is shaped such that first land ends K1 and recesses 151 are alternately arranged in the tire circumferential direction, the recesses 151 being indented from the wall surface of the first land end K1 in the tire axial direction, the wall surface facing outward in the tire axial direction. Furthermore, an outer round chamfer 92 and a round chamfer 96 that are arc-shaped in cross section are formed on the tops of the wall surfaces of the first land ends J1 and K1, respectively.

Thus, as will be described later, the occurrence of impact noise on the first land ends J1 and K1 can be reduced during the rotation of the tire, thereby suppressing pitch noise.

Furthermore, the end edges B3 and B4 of the ground contacting surfaces of the shoulder blocks 62 and 63 constituting the shoulder land 44 near the shoulder main groove 21 extend along the tire circumferential direction, and round chamfers 99 and 100 that are arc-shaped in cross section are connected to at least part of the edges in the tire circumferential direction. On at least part of the shoulder main grooves 20 and 21 in the tire circumferential direction, the round chamfers 97, 98, 99, and 100 correspond to a first round chamfer, the round chamfers 97, 98, 99, and 100 being located on the tops of the wall surfaces of the ground contacting ends T1 and T2 and formed at portions connected to the ground contacting surfaces of the shoulder lands 41 and 44.

Thus, the round chamfers 92, 96, 97, 98, 99, and 100 that are arc-shaped in cross section are connected to the end edges located at the ends of the ground contacting surfaces of the lands 41, 42, 43, and 44 in the tire axial direction. This can suppress a change and uneven wear of the ground contact shape in the early period of wear of the lands 41, 42, 43, and 44. Moreover, the end edges A1, A2, B1, B2, B3, and B4 to which the round chamfers 92, 96, 97, 98, 99, and 100 are connected extend along the tire circumferential direction, thereby suppressing deterioration in traction performance in the tire circumferential direction due to the round chamfers 92, 96, 97, 98, 99, and 100.

As shown in FIG. 2, in the inner lands 42 and 43 that are connected around the tire in the circumferential direction, the end edges A1 and A2 and end edges C1 and C2 are provided on the end serving as one side or the other side of the ground contacting surface in the tire axial direction near the shoulder main grooves 20 and 21. The end edges A1 and A2 are end edges arranged along the tire circumferential direction and are connected to the round chamfers 92 and 96, and the end edges C1 and C2 are not connected to the round chamfers, are formed as edges, and correspond to second circumferential edges along the tire circumferential direction. On the shoulder main grooves 20 and 21, the end edges A1 (or A2) or groups of the adjacent end edges A1 (or A2) and end edges C1 (or C2) or groups of the adjacent end edges C1 (or C2) are alternately provided in the tire circumferential direction. FIG. 2 illustrates only a part of the tread 10 in the tire circumferential direction. The shapes of parts of the tread 10 in the tire circumferential direction are repeatedly connected around the tire in the tire circumferential direction.

In this way, the end edges C1 and C2 formed as edges along the tire circumferential direction are provided on the ends of the inner lands 42 and 43 near the shoulder main grooves 20 and 21, thereby improving the edge effect of the tire during cornering of the vehicle. In addition, on the shoulder main grooves 20 and 21, the end edges A1 (or A2) or groups of the adjacent end edges A1 (or A2) and end edges C1 (or C2) or groups of the adjacent end edges C1 (or C2) are alternately provided in the tire circumferential direction, achieving compatibility between the edge effect during cornering of the vehicle and suppression of a rapid change and uneven wear of a ground contact shape in the early period of wear of the tire.

Furthermore, $0.4 \leq L1/(L1+L2) \leq 0.9$ is satisfied where L1 is the total length of the end edge and L2 is the total length of the end edge around the tire in the tire circumferential direction. Thus, during one rotation of the tire, the ratio of the end edges connected to the round chamfers to the circumference and the ratio of the end edges formed as edges to the circumference are easily regulated to a proper range, achieving balanced compatibility between the edge effect during cornering of the vehicle and suppression of a rapid change and uneven wear of a ground contact shape in the early period of wear.

Moreover, according to the embodiment, the corner-outer round chamfer 92 or the round chamfer 96, that are arc-shaped in cross section is formed on a portion that serves as the top of the wall surface forming the shoulder main grooves 20 and 21 and is connected to the ground contacting surface of each of the inner lands 42 and 43, and the dimple round chamfer 94 that is arc-shaped in cross section is formed on a portion that serves as the top of the wall surface forming the dimple 75 and is connected to the ground contacting surface of each of the inner lands 42 and 43. This can further reduce a contact pressure applied to the end edges of the ground contacting surfaces of the inner lands 42 and 43. Furthermore, as described above, the corner-outer round chamfer formed on the tops of the wall surfaces of the shoulder main grooves 20 and 21 having large depths has a larger curvature radius than the dimple round chamfer 94 formed on top of the wall surface of the dimple 75 having a small depth. Thus, if the wall surfaces of the inner lands 42 and 43 are deformed when the tire comes into contact with the ground, rubber can be properly compressed while suppressing deformation of the wall surfaces of the inner lands 42 and 43 to the inside of the inner lands 42 and 43 according to the maximum depths or the dimple depths of the shoulder main grooves 20 and 21. In other words, the compression amount of rubber near the formation portion of the dimple 75 on the ground contacting surface is smaller than that of the formation portion of the shoulder main groove 20, so that the curvature radius of the dimple round chamfer 94 can be smaller than that of the formation portion of the shoulder main groove 20. This can effectively suppress an increase in pressure on the edges of the tops of the inner lands 42 and 43. Thus, a contact pressure on the ground contacting surface can be dispersed, thereby increasing the effect of suppressing uneven wear in the early period.

In addition, according to the embodiment, the curvature radii of the corner-outer round chamfer 92 and the round chamfer 96 are equal to or larger than 6 mm, and the curvature radius of the dimple round chamfer 94 is less than 6 mm, e.g., 5 mm or less.

In addition, the curvature radius Ra of the corner-outer round chamfer 92 is preferably equal to or greater than 40% and equal to or less than 85% of a shoulder main groove depth d3, and the curvature radius of the dimple round chamfer 94 is preferably equal to or larger than 1 mm. For example, the shoulder main groove depth d3 is 13 mm, and the dimple depth d1 is 3 mm. More preferably, the curvature radius Rb of the dimple round chamfer 94 is equal to or larger than 2 mm. For example, the curvature radius Ra of the corner-outer round chamfer 92 can be set at 7 mm, and the curvature radius Rb of the dimple round chamfer 94 can be set at 4 mm. Furthermore, as shown in FIG. 6C illustrating the inner land 42, a round chamfer 101 that is arc-shaped in cross section is formed also on a portion connecting the wall surface of each of the inner lands 42 and 43 near the center main groove 22 to the bottom 75*b* of the dimple 75.

In addition, in at least parts of the shoulder main grooves 20 and 21 in the tire circumferential direction, the round chamfers 97, 98, 99, and 100 that are arc-shaped in cross section are formed at portions that are located on the tops of the wall surfaces near the ground contacting ends T1 and T2 and are connected to the ground contacting surfaces of the shoulder lands 41 and 44. Moreover, the corner-outer round chamfer 92 and the round chamfer 96 are formed on portions that are located on the tops of the wall surfaces of the shoulder main grooves 20 and 21 near the tire-axial-direction center CL and are connected to the ground contacting surfaces of the inner lands 42 and 43.

Thus, when the tire coming into contact with the ground causes wiping deformation, that is deformation of rubber toward the center in the tire axial direction, a pressure increase on the edges of lands on both sides of the shoulder main grooves 20 and 21 can be suppressed, so that a contact pressure on the ground contacting surface can be more effectively dispersed to more effectively enhance the effect of suppressing uneven wear in the early period. This configuration will be specifically described below using FIGS. 6F and 6G.

Figure 6F:
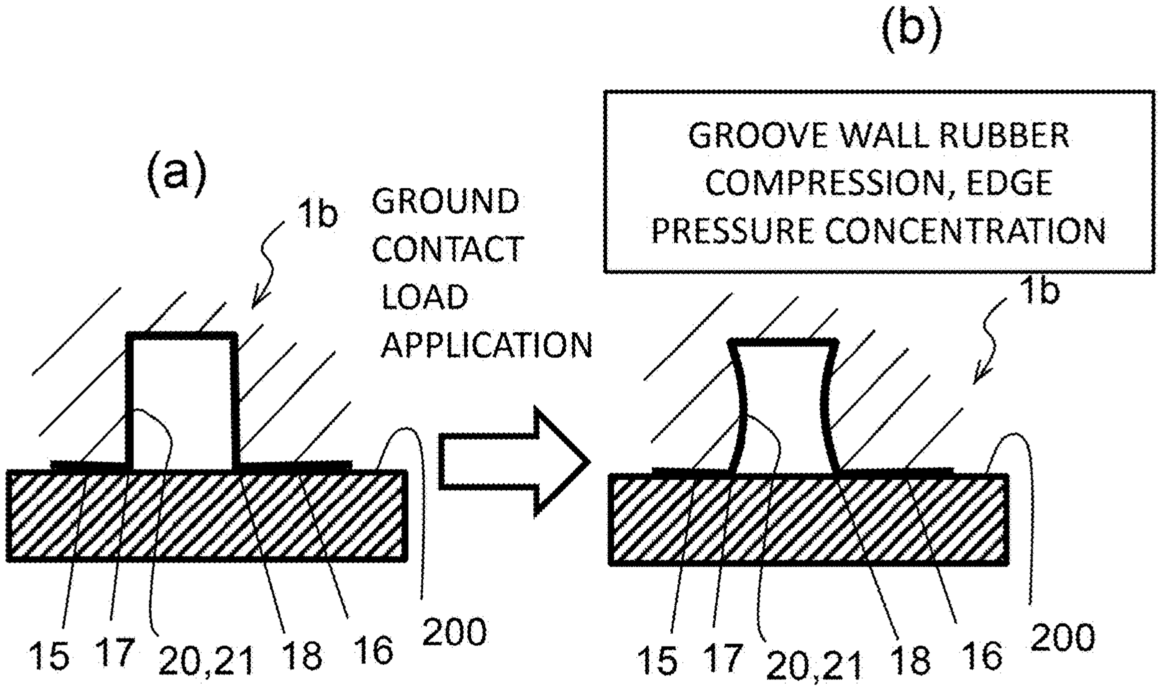
FIG. 6F is a schematic cross-sectional view illustrating, in a comparative example, the contact state between the vicinity of shoulder main grooves on ground contacting surfaces and a road surface on the assumption that no ground contact load is applied to a tire, (b) illustrating a view corresponding to (a) in a state in which the ground contact load is applied.

FIG. 6F is a schematic cross-sectional view illustrating, in a comparative example, the contact state between the vicinity of the shoulder main grooves 20 and 21 on ground contacting surfaces 15 and 16 and a road surface 200 on the assumption that no ground contact load is applied to a tire 1*b*. (b) is a view corresponding to (a) in a state where the ground contact load is applied. In the tire 1*b* of the comparative example illustrated in FIG. 6F, as shown in (a), a round chamfer is not formed between the tops of both wall surfaces constituting the shoulder main grooves 20 and 21 of the tread and the ground contacting surfaces 15 and 16, and end edges 17 and 18 of the ground contacting surfaces 15 and 16 near the shoulder main grooves 20 and 21 are angular edges.

In the tire 1*b* of the comparative example, as shown in (b), when a ground contact load is applied to the tire 1*b* by a reaction from the road surface due to the weight, rubber is compressed such that both wall surfaces of the shoulder main grooves 20 and 21 are pressed into the shoulder main grooves 20 and 21. Moreover, the rubber of the tire 1*b* is likely to have maximum contact pressure due to wiping deformation in a portion forming the shoulder main grooves 20 and 21. Thus, a large contact pressure is likely to occur on the end edges 17 and 18 of the ground contacting surfaces 15 and 16 near the shoulder main grooves 20 and 21, causing uneven wear in the early period.

Figure 6G:
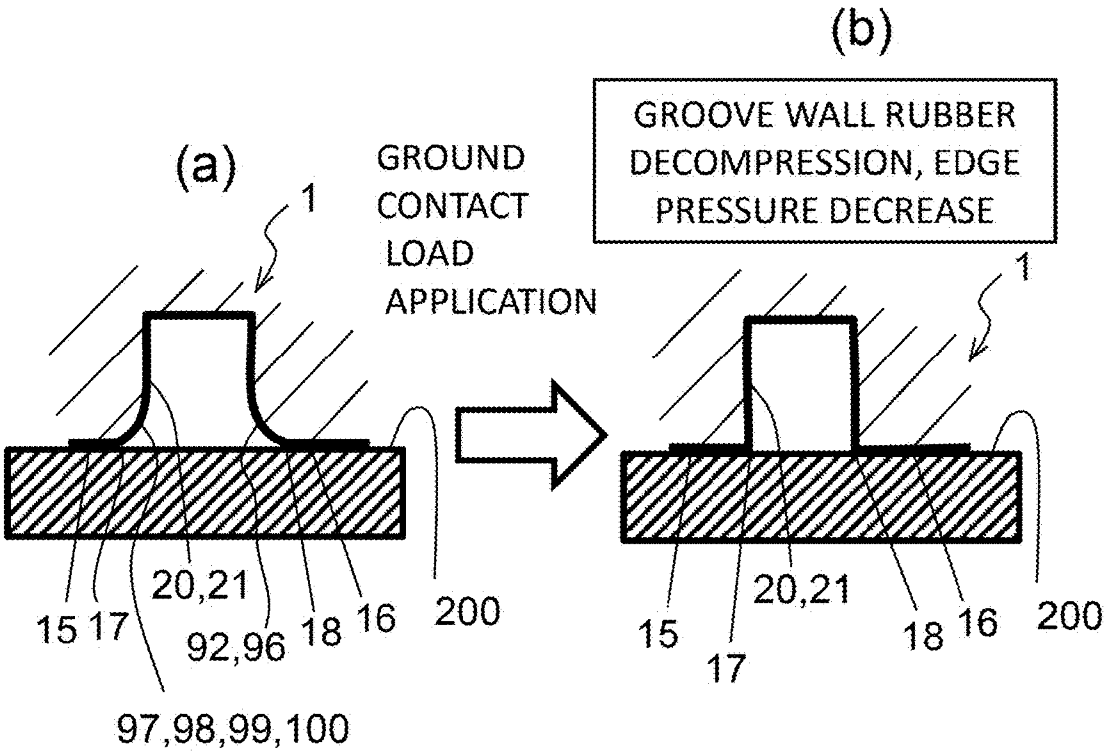
FIG. 6G is a schematic cross-sectional view illustrating, in the embodiment, the contact state between the vicinity of the shoulder main grooves on the ground contacting surfaces and the road surface on the assumption that no ground contact load is applied to the tire, (b) illustrating a view corresponding to (a) in a state in which the ground contact load is applied.

In the embodiment, FIG. 6G is a view corresponding to FIGS. 6F (a) and (b). As described above, in the embodiment, the round chamfers 97, 98, 99, 100, 92, and 96 that are arc-shaped in cross section are formed between the tops of both wall surfaces constituting the shoulder main grooves 20 and 21 of the tread and the ground contacting surfaces 15 and 16 in the tire 1. In the embodiment, when a ground contact load is applied to the tire 1, deformation of both wall surfaces of the shoulder main grooves 20 and 21 into the grooves can be suppressed by deformation of the round chamfers 97, 98, 99, 100, 92, and 96. Thus, even when a ground contact load is applied to the tire 1, a large contact pressure can be suppressed on the end edges 17 and 18 of the ground contacting surfaces 15 and 16 near the shoulder main grooves, thereby suppressing uneven wear in the early period.

Figure 6H:
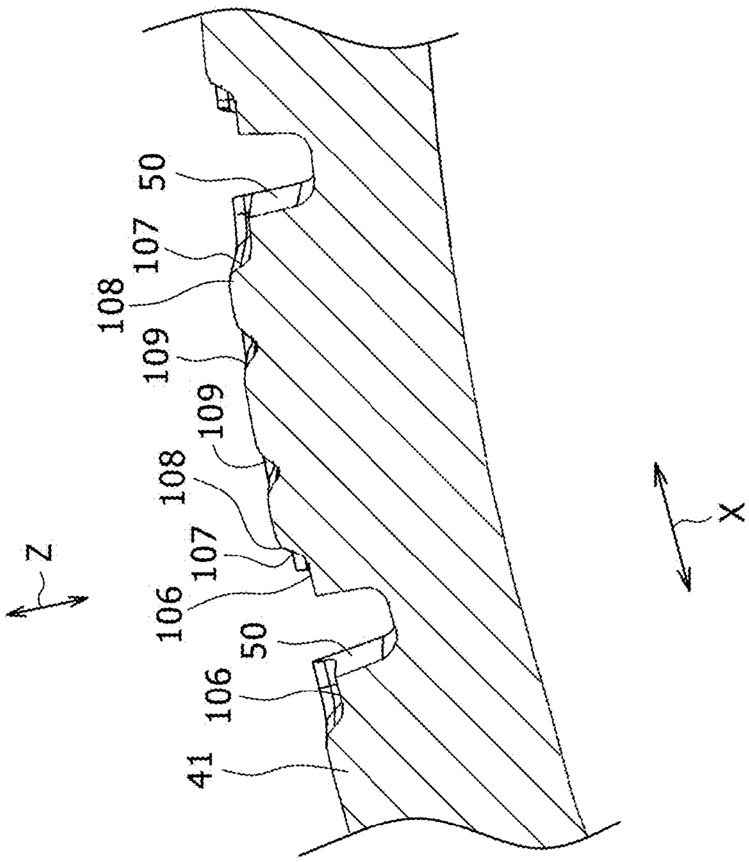
FIG. 6H is a cross-sectional view taken along line H-H of FIG. 2.

FIG. 6H is a cross-sectional view taken along line H-H of FIG. 2. As shown in FIGS. 3 and 6H, shallow shoulder grooves 106 are provided at both tire-circumferential ends of the ground contacting surfaces of the shoulder lands 41 and 44 near the shoulder main grooves 20 and 21. The shallow shoulder grooves 106 that are substantially U-shaped are provided along the circumferential edges of the ground contacting surfaces of the shoulder blocks 60, 61, 62, and 63 near the shoulder main grooves 20 and 21. Between the bottom of the shallow shoulder groove 106 and the ground contacting surface that is the top face of the shoulder block, a wall surface 107 is provided in such a manner as to tilt outward in the tire radial direction toward the center of the shoulder block in the tire circumferential direction. The wall surface 107 and the ground contacting surface of the shoulder block are connected to each other via a shallow-groove round chamfer 108 that is arc-shaped in cross section. The shallow shoulder grooves 106 are provided between the adjacent shoulder blocks 60, 61, 62, and 63 and are opened to lug grooves 50 and 51 tilting in the tire axial direction and the shoulder main grooves 20 and 21. A shallow groove depth from the bottom of the shallow shoulder groove 106 to the ground contacting surface of the shoulder block can be set at, for example, equal to or greater than 5% and equal to or less than 50% of the maximum depth d3 of the shoulder main groove.

Thus, the shallow shoulder grooves 106 easily compress mud of muddy terrains. This can improve traction performance in the tire circumferential direction and more effectively disperse a contact pressure on the ground contacting surface of the shoulder block, thereby more effectively enhancing the effect of suppressing uneven wear in the early period.

Furthermore, on the shoulder blocks provided with the shallow shoulder grooves 106, the round chamfers 97, 98, 99, and 100 that are arc-shaped in cross section are formed as main-groove round chamfers on portions that serve as the top edges facing the shoulder main grooves 20 and 21 and are connected to the wall surfaces of the shallow shoulder grooves 106. Thus, even when a contact pressure applied to the edge of the shallow shoulder groove 106 of the shoulder block increases, a contact pressure on the ground contacting surface of the shoulder block can be more effectively dispersed to more effectively enhance the effect of suppressing uneven wear in the early period.

In the configuration of the present example, the shallow shoulder groove 106 of the shoulder block is also provided on the wall surface of the intermediate portion in the tire circumferential direction near the shoulder main groove, so that the shallow shoulder groove 106 is provided in a continuous U-shape when viewed from the outside in the tire radial direction. A configuration may be adopted in which the shallow shoulder groove 106 of the shoulder block is not provided on the wall surface of the intermediate portion in the tire circumferential direction near the shoulder main groove, but the two shallow shoulder grooves 106 are separately provided on both ends of the shoulder block in the tire circumferential direction.

Two shallow grooves 109 arranged in the tire circumferential direction are formed in the intermediate portion of the ground contacting surface of the shoulder block in the tire axial direction. The two shallow grooves 109 extend substantially along the tire axial direction, and wall surfaces on both sides of the shallow groove 109 in the tire circumferential direction are inclined surfaces that tilt in the tire radial direction so as to be spaced apart from each other toward the outside in the tire radial direction. A round chamfer that is arc-shaped in cross section is formed at the connection portion between the inclined surface of the shallow groove 109 and the ground contacting surface of the shoulder block.

Configuration and Effect of Chamfering Near Sipe

Furthermore, in the present embodiment, the sipe is formed on the ground contacting surface of each of the inner lands 42 and 43. Furthermore, as shown in FIG. 3, in the inner lands 42 and 43, the fine-line sipe 85 is formed between the U-shaped ground contacting surface S1 of the first rib 74 and an edge of the ground contacting surface S3 at the corner of each of the inner lands 42 and 43, the edge being located near the center main groove 22, the sipe 85 being substantially U-shaped when viewed from the outside in the tire radial direction. Furthermore, on the ground contacting surfaces of the inner lands 42 and 43, the fine-line sipe 91 is formed on a portion surrounding the ground contacting surfaces on both ends of the connecting ribs 72 and 73, the sipe 91 being substantially U-shaped when viewed from the outside in the tire radial direction.

In addition, the inner lands 42 and 43 include the dimples 75 and 90 that are grooves having end edges located within 10 mm from the sipes 85 and 91 and connected to the dimple round chamfers 94 and 90*b* that are arc-shaped in cross section. This can suppress an increase in pressure on edges around the sipes 85 and 91, on which a contact pressure is likely to increase, on the inner lands 42 and 43 including the sipes 85 and 91. Thus, a contact pressure can be dispersed on the ground contacting surfaces where the sipes 85 and 91 are formed, thereby suppressing uneven wear in the early period. Moreover, a round chamfer does not need to be formed on the tops of the wall surfaces of the sipes 85 and 91, thereby suppressing a reduction in the stiffness of the inner lands 42 and 43.

Furthermore, the wall surfaces of the dimples 75 and 90 including the dimple round chamfers 94 and 90*b* are parallel to at least a part of the sipes 85 and 91. This can further suppress an increase in pressure on edges around the sipes 85 and 91, on which a contact pressure is likely to increase, on the inner lands 42 and 43. Thus, a contact pressure can be further dispersed on the ground contacting surfaces where the sipes 85 and 91 are formed, thereby further suppressing uneven wear in the early period.

Moreover, when viewed from the outside in the tire radial direction, the sipes 85 and 91 are U-shaped to surround portions where the dimple round chamfers 94 and 90*b* of the dimples 75 and 90 are formed. Thus, a groove area necessary for suppressing uneven wear in the early period can be smaller than in the case where a linear sipe is formed and a groove is provided around the sipe.

In addition, the maximum depth of the sipes 85 and 91 is 40% or more of the maximum depth of the main grooves 20, 21, and 22, and the sipes 85 and 91 are provided so as to separate the inner lands 42 and 43 when viewed from the outside in the tire radial direction.

Figure 6I:
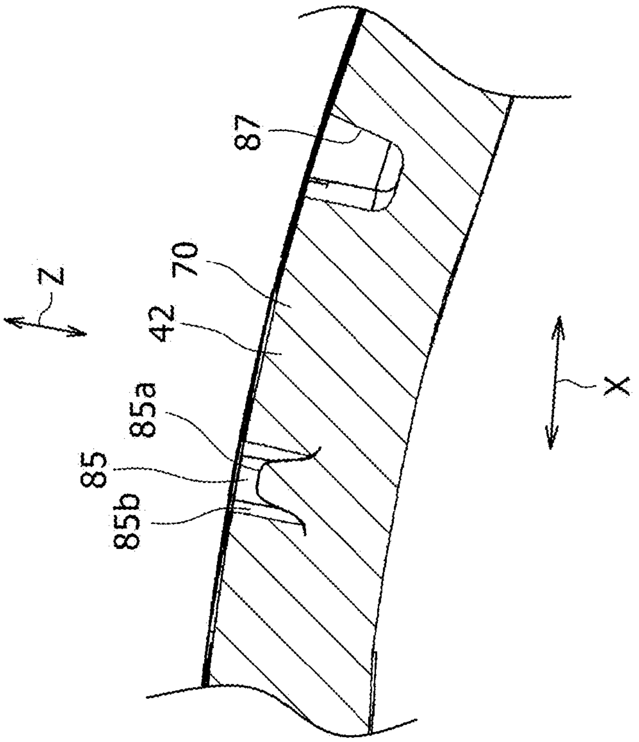
FIG. 6I is a cross-sectional view taken along line I-I of FIG. 2.

FIG. 6I is a cross-sectional view taken along line I-I of FIG. 2. As shown in FIG. 6I, the sipe 85 has a minimum depth near the center of the circumferential portion 85*a* extending in the tire circumferential direction of the intermediate portion. The sipe 85 has a maximum depth at leg portions 85*b* extending to be spaced apart from each other on both ends toward the center main groove 22. The maximum depth is 40% or more of the maximum depth of the main grooves 20, 21, and 22.

Figure 6J:
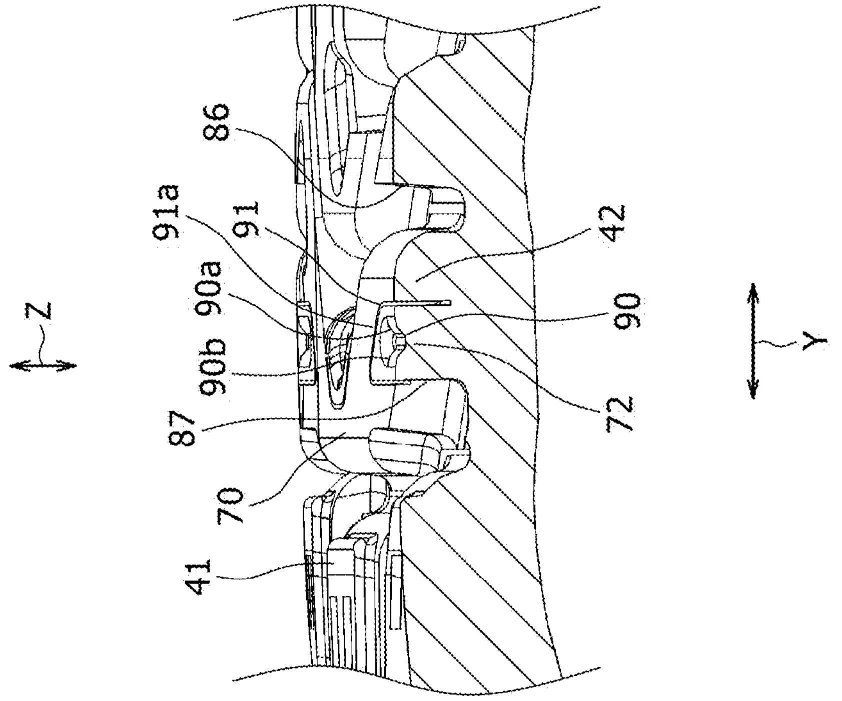
FIG. 6J is a cross-sectional view taken along line J-J of FIG. 5.
Figure 6K:
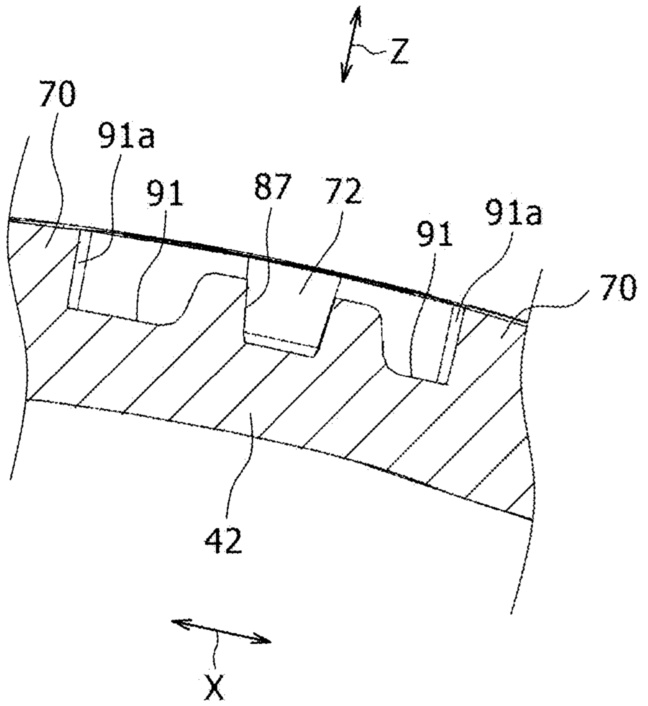
FIG. 6K is a cross-sectional view taken along line K-K of FIG. 5.

FIG. 6J is a cross-sectional view taken along line J-J of FIG. 5. FIG. 6K is a cross-sectional view taken along line K-K of FIG. 5. As shown in FIGS. 6J and 6K, both ends of the sipe 91 are opened to the lug groove 86 and the lug groove 87. The sipe 91 has a minimum depth at a portion connecting to the lug grooves 86 and 87, gradually increases in depth toward the rear end of the inner block 70, and has a maximum depth at a tilt portion 91*a* that tilts on the rear end of the inner block 70 in the tire circumferential direction. The maximum depth of the tilt portion 91*a* is 40% or more of the maximum depth of the main grooves 20, 21, and 22.

This increases the flexibility of the inner blocks 70 and 71, the first rib 74, and the connecting rib 72 that are separated by the sipes 85 and 91, thereby easily dispersing a pressure of the ground contacting surfaces of the inner lands 42 and 43.

Furthermore, the inner lands 42 and 43 on which the sipes 91 are formed include the inner blocks 70 and 71 that serve as first blocks having recessed shapes provided on one sides of the sipes 85 and 91, and the first rib 74 and the connecting rib 72 that are provided on the other sides of the sipes 85 and 91 and serve as second blocks having insertion portions located inside the recessed shapes of the inner blocks 70 and 71. The overall first rib 74 and both tire-circumferential ends of the connecting rib are the insertion portions.

Moreover, on the sides where the first rib 74 and the connecting rib 72 are remote from the sipes 85 and 91, the dimples 75 and 90 are provided with a smaller depth than the maximum depth of the main grooves 20, 21, and 22. Furthermore, the dimple round chamfers 94 and 90*b* that are arc-shaped in cross section are formed on the tops of the wall surfaces of the dimples 75 and 90. Thus, leaning of separate portions on both sides of the U-shapes of the inner blocks 70 and 71 is suppressed by the first rib 74 and the connecting ribs 72 and 73 inside the U-shapes, whereas leaning of the first rib 74 and the connecting ribs 72 and 73 is suppressed by the inner blocks 70 and 71. This can increase the stiffness of the inner blocks 70 and 71, the first rib 74, and the connecting ribs 72 and 73. In addition, a contact pressure can be dispersed on the ground contacting surfaces of the ribs 74, 72, and 73, thereby suppressing uneven wear in the early period.

Grooved Configuration in Tire Circumferential Direction and Configuration and Effect of Chamfering in Grooved Configuration Furthermore, in the present embodiment, the inner blocks 70 and 71 constituting the inner lands 42 and 43 include the circumferential portions U2 and V2 at the distal ends in the tire axial direction, the U-shaped wall surfaces formed by the tilt portions U3, U5, V3, and V5 and the circumferential portions U4 and V4 that are recesses indented in the tire axial direction from the wall surfaces of the circumferential portions U2 and V2, the wall surfaces facing the tire axial direction, and the end circumferential portions U6 and V6 connected to ends of the wall surfaces in the tire circumferential direction and extending in the tire circumferential direction. The circumferential portions and the wall surfaces are arranged in the tire circumferential direction. The tire axial ends of the circumferential portions U2 and V2 are first land ends. The tire axial ends of the circumferential portions U6 and V6 are second land ends. Furthermore, round chamfers 110 and 111 that are arc-shaped in cross section are formed on the tops of the tire-axial wall surfaces of the circumferential portions U2 and V2, the wall surfaces facing the center main groove 22, and the tops of the wall surfaces of the end circumferential portions U6 and V6, the wall surfaces facing the circumferential portions 86*a* and 88*a* of the tire-axial lug grooves 86 and 88.

Thus, the inner lands 42 and 43 are shaped such that the first land end, the second land end, and a recess are arranged with a single land in the order of the first land end, the recess, and the second land end. The recess is indented from the wall surface of each of the land ends, the wall surface facing the tire axial direction. Moreover, the round chamfers 110 and 111 are formed on the tops of the wall surfaces of the land ends, the wall surfaces facing the tire axial direction. As described above, irregularities are formed in the tire circumferential direction by the first land ends, the recesses, and the second land ends, so that the center main groove 22 in a zigzag can reduce an air columnar resonance noise of component of tire noise. Furthermore, the round chamfers 110 and 111 that are arc-shaped in cross section are formed on the tops of the wall surface of the land ends, thereby reducing the occurrence of impact noise on the land ends during rotations of the tire even when the weight of the vehicle increases. This can suppress pitch noise. In addition, the round chamfers 110 and 111 can reduce a pressure when the edges of the ground contacting surfaces of the land ends come into contact with the ground, thereby suppressing uneven wear in the early period.

Furthermore, in the present embodiment, the inner lands 42 and 43 are single lands, each constituting one wall surface of a pair of wall surfaces constituting the shoulder main grooves 20 and 21 on both sides in the tire axial direction. As described above, the wall surfaces of the inner lands 42 and 43 near the shoulder main grooves 20 and 21 are shaped such that first land ends J1 and K1 and the recesses 150 and 151 are alternately arranged in the tire circumferential direction, the recesses 150 and 151 being indented from the wall surfaces of the first land ends J1 and K1 in the tire axial direction, the wall surfaces facing outward in the tire axial direction. Furthermore, an outer round chamfer 92 and a round chamfer 96 that are arc-shaped in cross section are formed on the tops of the wall surfaces of the first land ends J1 and K1, respectively.

This forms irregularities in the tire circumferential direction. Thus, the shoulder main grooves 20 and 21 are shaped to extend in the tire circumferential direction while bending in the tire axial direction, thereby reducing air columnar resonance noise. Furthermore, the outer round chamfer 92 and the round chamfer 96 that are arc-shaped in cross section are formed on the tops of the wall surfaces of the first land ends J1 and K1, thereby reducing the occurrence of impact noise on the first land ends J1 and K1 during rotations of the tire even when the weight of the vehicle increases. This can further suppress pitch noise. In addition, the round chamfers 92 and 96 can reduce a pressure when the edges of the ground contacting surfaces of the first land ends J1 and K1 come into contact with the ground, thereby suppressing uneven wear in the early period.

Furthermore, in the present embodiment, as shown in FIGS. 1 and 6, the shoulder blocks 60 and 61 constitute the shoulder land 41 on the OUT side out of the pair of shoulder lands 41 and 44 such that the shoulder blocks 60 having first land ends E1 and the shoulder blocks 61, each of which has a recess 114 indented from a wall surface 116 of the first land end E1 in the tire axial direction, are alternately arranged in the tire circumferential direction, the wall surface 116 facing outward in the tire axial direction. The shoulder block 60 corresponds to a first block, and the shoulder block 61 corresponds to a second block.

The recess 114 of the shoulder block 61 is provided in the intermediate portion of the tire-axial outer surface of the shoulder block 61 in the tire circumferential direction and extends in the tire radial direction. The recess 114 is shaped such that a pair of inclined surfaces that increase in depth from both ends toward the center in the tire radial direction and a pair of inclined surfaces that increase in depth from both ends toward the center in the tire circumferential direction are connected to each other at the bottom. The outer end of the recess 114 in the tire radial direction nearly corresponds to the ground contacting end T1.

The shoulder block 60 has a recess 115 provided in an inner portion in the tire radial direction in an intermediate portion in the tire circumferential direction on the outer surface in the tire axial direction.

As shown in FIG. 6, the wall surface 116 of the first land end E1 of the shoulder block 60 is provided near the ground contacting end T1 and includes an inclined surface 116*b* that tilts outward in the tire axial direction and toward the inside in the tire radial direction. Thus, particularly on the outer end around the ground contacting end T1 in the tire radial direction on the outer surface in the tire axial direction, irregularities are formed in the tire circumferential direction by the first land ends E1 and the recesses 114.

Furthermore, a round chamfer 116*a* that is arc-shaped in cross section is formed on top of the wall surface 116 facing outward on the first land ends E1 in the tire axial direction. The round chamfer 116*a* is connected between the inclined surface 116*b* and the ground contacting surface of the shoulder block 60.

Thus, the outer end of the shoulder land 41 in the tire axial direction is shaped such that the first land ends E1 and the recesses 114 are alternately arranged in the tire circumferential direction by combining the shoulder blocks 60 and 61 that are a plurality of lands. The recess 114 is indented from the wall surface 116 of the first land end E1 in the tire axial direction, the wall surface 116 facing the tire axial direction. Moreover, the round chamfer 116*a* is formed on top of the wall surface 116 of the first land end E1, the wall surface 116 facing the tire axial direction. As described above, irregularities are formed in the tire circumferential direction by the first land ends E1 and the recesses 114, thereby improving traction performance on a rough road. Furthermore, the round chamfer 116*a* that is arc-shaped in cross section is formed on top of the wall surface 116 of the first land end E1, thereby reducing the occurrence of impact noise on the first land end E1 during rotations of the tire even when the weight of the vehicle increases. This can further suppress pitch noise. In addition, the round chamfers can reduce a pressure when the edges of the ground contacting surfaces of the first land ends E1 come into contact with the ground, thereby suppressing uneven wear in the early period.

Figure 7:
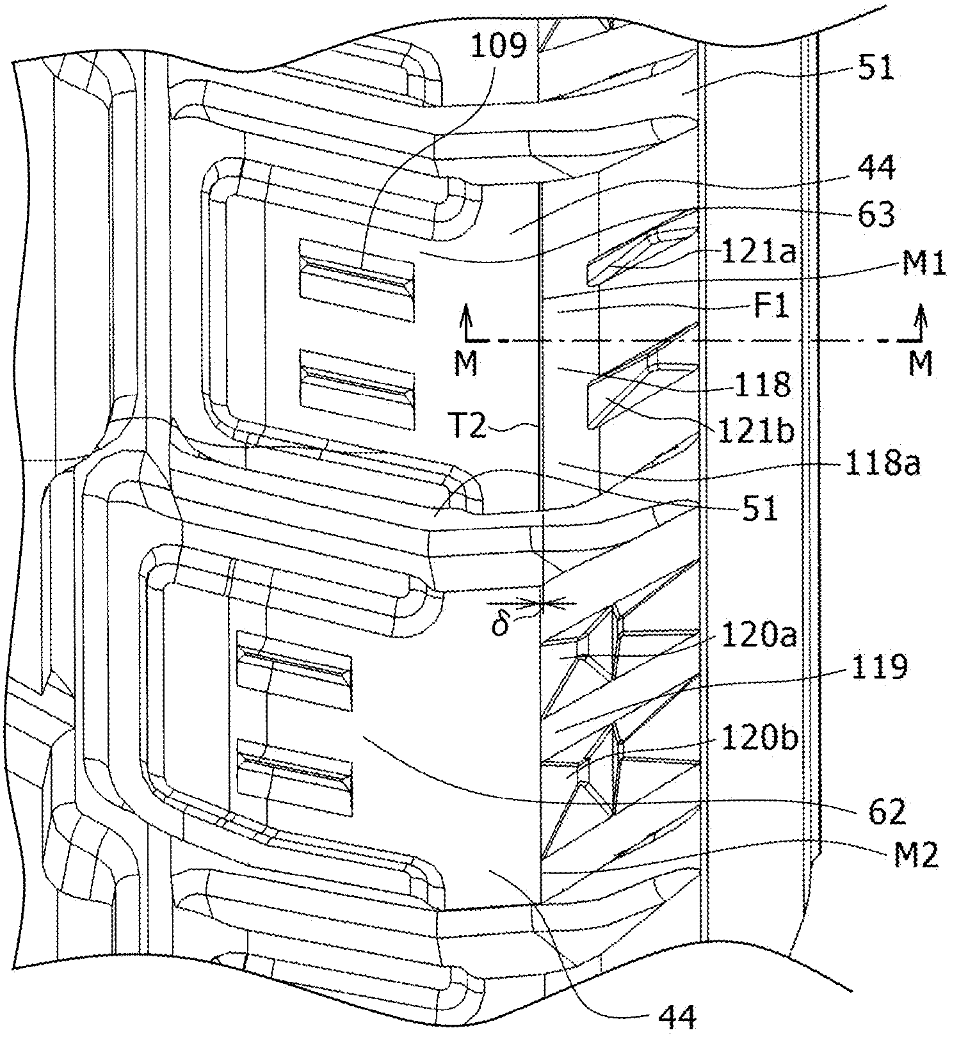
FIG. 7 is an enlarged view of part L in FIG. 2.
Figure 8:
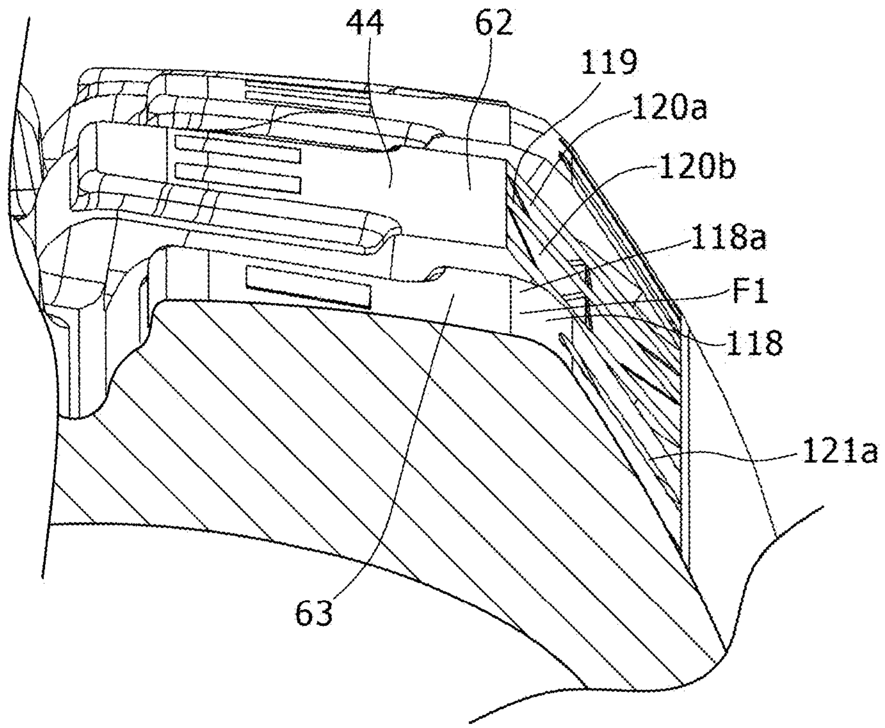
FIG. 8 is a cross-sectional view taken along line M-M of FIG. 7.

Furthermore, in the present embodiment, as shown in FIGS. 7 and 8, the shoulder blocks 62 and 63 constitute the shoulder land 44 on the IN side out of the pair of shoulder lands 41 and 44 such that the shoulder blocks 63 having the first land ends F1 and the shoulder blocks, each of which has a wall surface 119 as a recess indented from a wall surface 118 of the first land end F1 in the tire axial direction, are alternately arranged in the tire circumferential direction, the wall surface 118 facing outward in the tire axial direction. The shoulder block 63 corresponds to a first block, and the shoulder block 62 corresponds to a second block. Specifically, a tire-axial outer end edge M1 on the top face including the ground contacting surface of the shoulder block 63 protrudes outward in the tire axial direction by 8 shown in FIG. 7 from a tire-axial outer end edge M2 on the top surface including the ground contacting surface of the second shoulder block 62. Thus, the wall surfaces 118 of first land ends F1 of the shoulder blocks 63 including the outer end edges M1 in the tire axial direction and wall surfaces 119 are alternately placed in the tire circumferential direction, the wall surface 119 serving as a recess on the outer end of the shoulder block 62 in the tire axial direction.

Two recesses 120*a* and 120*b* and two recesses 121*a* and 121*b* that extend in the tire radial direction and are arranged in the tire circumferential direction are formed on the wall surfaces 119 and 118 of the shoulder blocks 62 and 63. The recesses 120*a* and 120*b* of the shoulder block 62 extend widely in the tire radial direction such that both ends in the tire radial direction nearly reach the inner end and the outer end of the wall surface 119 of the shoulder block 62 in the tire radial direction. The inner ends of the recesses 121*a* and 121*b* of the shoulder block 63 in the tire radial direction nearly reach the inner end of the wall surface 118 of the shoulder block 63 in the tire radial direction, but the outer ends of the recesses 121*a* and 121*b* in the tire radial direction extend shortly in the tire radial direction without reaching the outer end of the wall surface 118 in the tire radial direction.

As described above, the wall surfaces 119 and 118 of the shoulder blocks 62 and 63 include the recesses 120*a* and 120*b* formed on the wall surfaces 119 of the shoulder block 62, and the wall surfaces 119 are formed as recesses indented inward from the wall surface 118 in the tire axial direction. Thus, in a vehicle traveling on rough terrain, the recesses are likely to catch rock, soil, or dirt, thereby improving the traction performance.

Moreover, as shown in FIG. 8, a round chamfer 118*a* that is arc-shaped in cross section is formed on top of the wall surface 118 of the first land end F1, the wall surface 118 facing outward in the tire axial direction.

Thus, the outer end of the shoulder land 44 in the tire axial direction is shaped such that the first land ends F1 and the recesses are alternately arranged in the tire circumferential direction by combining the shoulder blocks 62 and 63 that are multiple lands. The recess is indented from the wall surface 118 of the first land end F1 in the tire axial direction, the wall surface 118 facing the tire axial direction. Moreover, the round chamfer 118*a* is formed on top of the wall surface 118 of the first land end F1, the wall surface 118 facing the tire axial direction. Thus, the occurrence of impact noise can be reduced on the first land end F1 during rotations of the tire even when the weight of the vehicle increases. This can further suppress pitch noise. In addition, the round chamfer 118*a* can reduce a pressure when the edges of the ground contacting surfaces of the first land ends F1 come into contact with the ground, thereby suppressing uneven wear in the early period.

A configuration may be adopted in which the recesses 120*a* and 120*b* are not formed on the wall surfaces 119 of the shoulder block 62 that include the wall surfaces 119 as recesses. This configuration can also obtain the effect of improving traction performance on a rough road using irregularities formed with the wall surface of the shoulder block 63 in the tire circumferential direction.

Configuration and Effect of Block Shape of Inner Land

Furthermore, according to the present embodiment, the inner lands 42 and 43 include the plurality of inner blocks 70 and 71 that are arranged in the tire circumferential direction and have one end or the other end adjacent to the shoulder main groove 20 or the other shoulder main groove 21 in the tire axial direction. The inner blocks 70 and 71 are formed in a shape like an inverted letter S by alternately connecting the tilt portions U1, U3, U5, V1, V3, and V5 tilting in the tire circumferential direction and the circumferential portions U2, U4, U6, V2, V4, and V6 extending in the tire circumferential direction.

The circumferential portions U2, U4, U6, V2, V4, and V6 include the end circumferential portions U6 and V6 provided on one tire circumferential end or the other tire circumferential end of the inner blocks 70 and 71. Furthermore, the end circumferential portions U6 and V6 are disposed between both axial ends of the inner blocks 70 and 71 in the tire axial direction.

Thus, the present embodiment can extend the range of a continuous portion in a contact part in the tire axial direction compared with a configuration in which three or more inner lands are provided between the pair of shoulder main grooves of a tread such that the inner lands are separated in the tire axial direction by two or more circumferential main grooves extending along the tire circumferential direction. This can improve the stiffness of the inner lands 42 and 43 disposed between the pair of shoulder main grooves 20 and 21. Moreover, the traction performance in the tire circumferential direction can be improved by the tilt portions U1, U3, U5, V1, V3, and V5 of the inner blocks 70 and 71. In addition, the circumferential portions 86*a* and 88*a* adjacent to the end circumferential portions U6 and V6, which can be located around the center in the tire axial direction, can be formed as circumferential grooves extending along the tire circumferential direction. Thus, in the tread 10, a decrease in drainage between the pair of shoulder main grooves 20 and 21 can be suppressed when the decrease in drainage is caused by a reduction in the number of circumferential main grooves extending along the tire circumferential direction. This can achieve compatibility between improvement in the stiffness of the inner lands 42 and 43 disposed between the pair of shoulder main grooves 20 and 21 and improvement in traction performance in the tire circumferential direction and suppression of a decrease in drainage.

Moreover, the tread 10 includes the first inner land 42 and the second inner land 43 that are two inner blocks disposed in engagement with each other when viewed from the outside in the tire radial direction. Thus, even when the inner lands 42 and 43 tend to lean on the contact part of the tread 10 during traveling, leaning can be suppressed, so that the stiffness of the inner lands 42 and 43 can be further improved.

When a predetermined range of a block pair group 130 including the two inner lands 42 and 43 in the tire circumferential direction is viewed from the outside in the tire radial direction, the tilt portions 86*b* and 88*b* of the lug grooves 86 and 88, the lug grooves 87 and 89, and the circumferential portions 86*a* and 88*a* of the lug grooves 86 and 88 are provided such that the tilt portions 86*b* and 88*b* are inclined grooves that are connected to at least one of the shoulder main grooves 20 and 21 and the center main groove 22, and that tilt in the tire circumferential direction, and the circumferential portions 86*a* and 88*a* are circumferential grooves that are connected to the center main groove 22 and extend in the tire circumferential direction. In this case, the total area of the tilt portions 86*b* and 88*b*, which serve as inclined grooves unconnected to any one of the pair of shoulder main grooves 20 and 21 and are connected to the center main groove 22, and the circumferential portions 86*a* and 88*a* serving as circumferential grooves, is larger than the total area of the lug grooves 87 and 89 serving as inclined grooves connected to one or the other of the shoulder main grooves 20 and 21. For example, in the length range of the block pair group 130 in the tire circumferential direction indicated by arrow G1 in FIG. 2, S2*a*>S1*a* is established where Sla is the total area of the lug grooves 87 and 89 and S2*a* is the total area of the tilt portions 86*b* and 88*b* and the circumferential portions 86*a* and 88*a*. This can increase the total area of the tilt portions 86*b* and 88*b* serving as inclined grooves in a central area, in which drainage is particularly required, in the tire axial direction and the circumferential portions 86*a* and 88*a* serving as circumferential grooves, thereby efficiently suppressing a decrease in drainage.

The circumferential portions U2, U4, U6, V2, V4, and V6 of the inner blocks 70 and 71 include the circumferential portions U2 and V2 that are provided on the other end or one end of the inner blocks 70 and 71 in the tire axial direction so as to protrude to the maximum extent in the tire axial direction and serve as protruding-side circumferential portions forming convex portions on the other end or one end in the tire axial direction.

Furthermore, the ratio of L2 to L1 is 1.9 to 2.1 where L1 is a first axial length (FIG. 2) that is the maximum length of the inner blocks 70 and 71 in the tire axial direction and L2 is a second axial length (FIG. 2) from the opposite ends of the inner blocks 70 and 71 from the circumferential portions U6 and V6 in the tire axial direction to the ends of the end circumferential portions U6 and V6 near the circumferential portions U2 and V2. This can increase the lengths of the tilt portions U1, U3, U5, V1, V3, and V5 of the inner blocks 70 and 71 in the tire axial direction while improving drainage in a central area in the tire axial direction. Thus, the traction performance in the tire circumferential direction can be improved.

Moreover, in the inner blocks 70 and 71, an angle formed by the extensions of the end edges forming the center main groove 22 is an acute angle on the ground contacting surfaces of at least some of the two adjacent tilt portions U1, U3, U5, V1, V3, and V5 from among the tilt portions U1, U3, U5, V1, V3, and V5. For example, an angle formed by end edges H1 and H2 in FIG. 2 is an acute angle. Thus, the tilt portions U1, U3, U5, V1, V3, and V5 are arranged along a direction being close to the tire axial direction, thereby improving traction performance in the tire circumferential direction.

Configuration of Another Example

Figure 9:
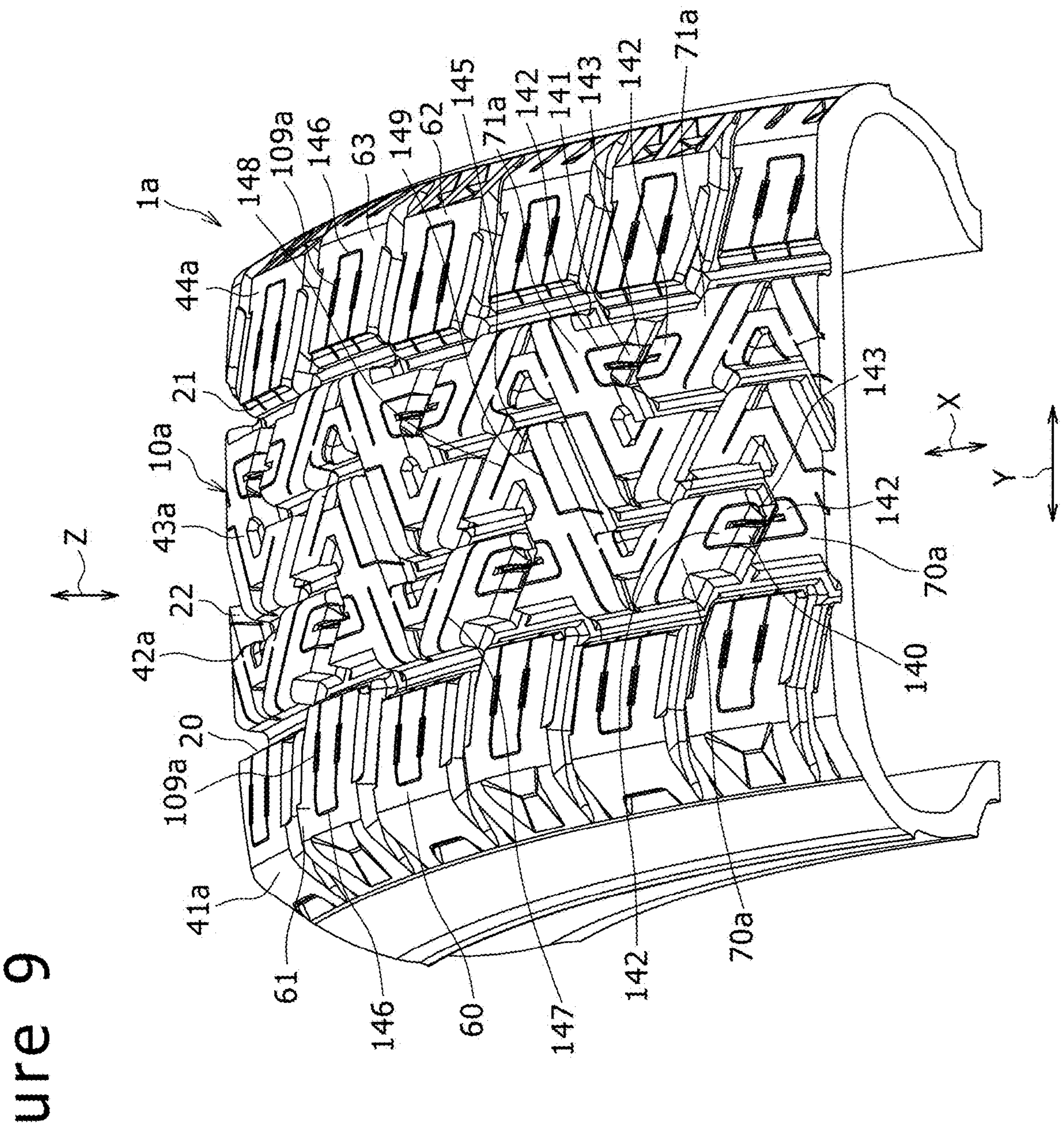
FIG. 9 is a perspective view illustrating a part of a pneumatic tire in the tire circumferential direction according to another example of the embodiment.
Figure 10:
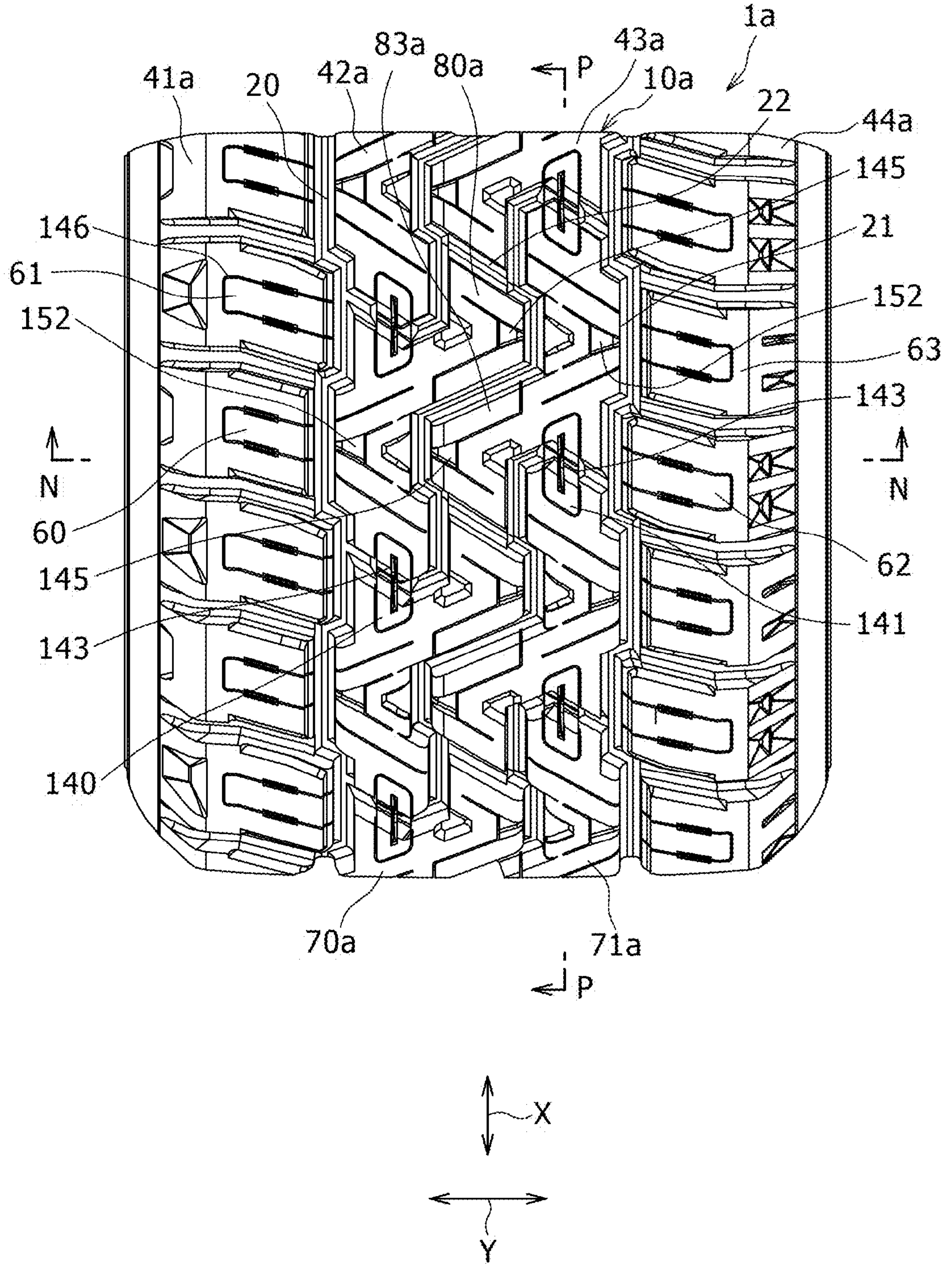
FIG. 10 is a plan view of the pneumatic tire shown in FIG. 9, illustrating a part of a tread in the circumferential direction.
Figure 11:
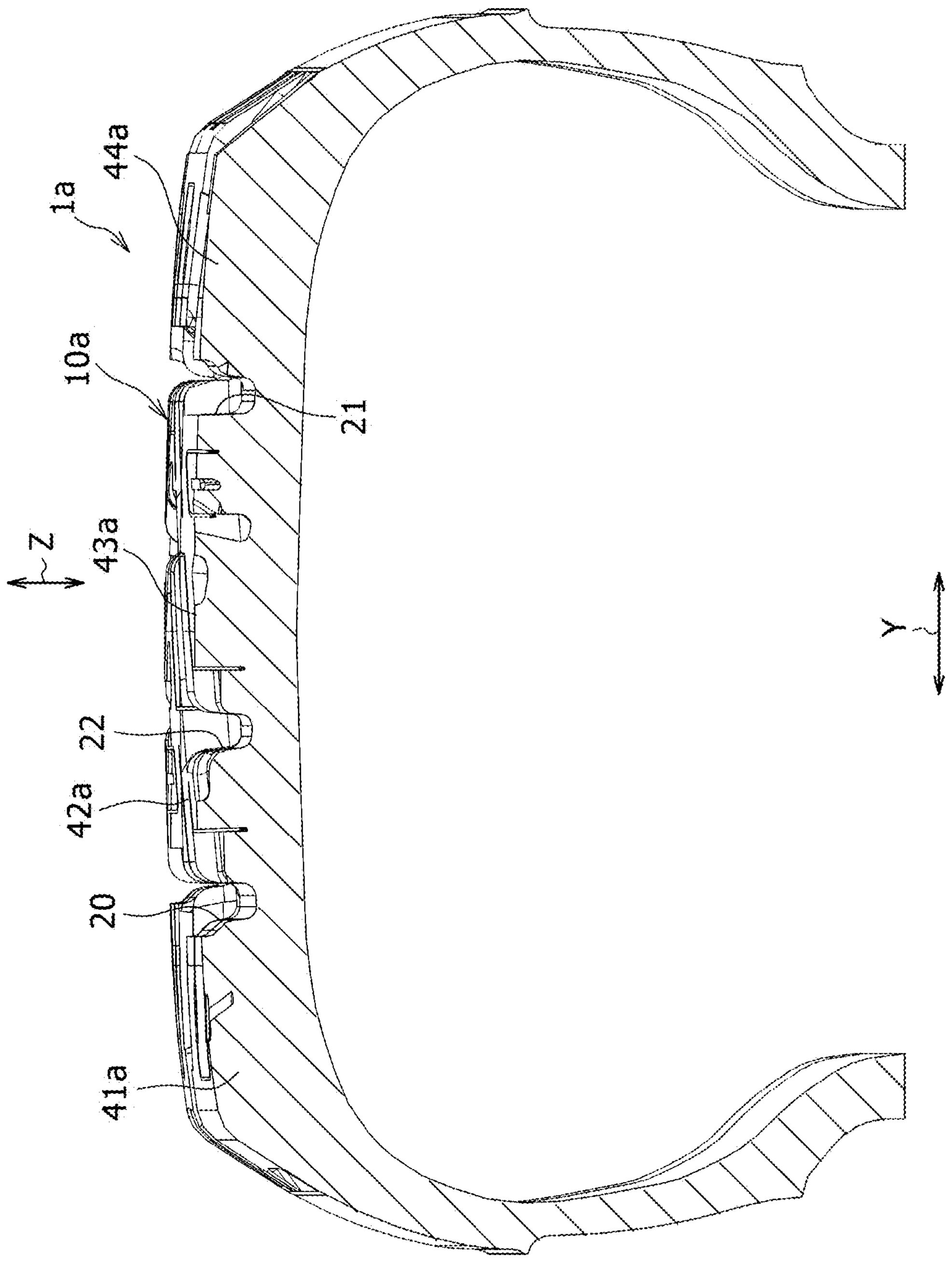
FIG. 11 is a cross-sectional view taken along line N-N of FIG. 10.
Figure 12:
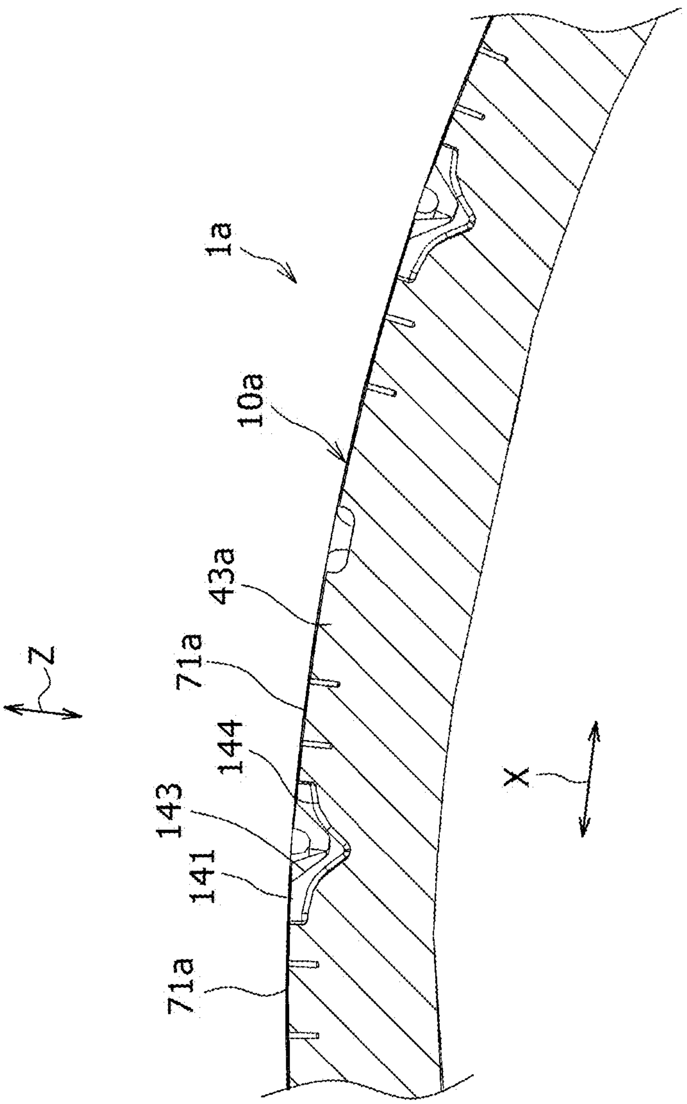
FIG. 12 is a cross-sectional view taken along line P-P of FIG. 10.

FIG. 9 is a perspective view illustrating a part of a tire 1*a* in the tire circumferential direction according to another example of the embodiment. FIG. 10 is a plan view of the tire 1*a*, illustrating a part of a tread 10*a* in the circumferential direction. FIG. 11 is a cross-sectional view taken along line N-N of FIG. 10. FIG. 12 is a cross-sectional view taken along line P-P of FIG. 10.

In the configuration of the present example, in the tread 10*a*, connecting ribs 140 and 141 provided on a first inner land 42*a* and a second inner land 43*a* include two rib ends 142 that are provided on both ends in the tire circumferential direction while being placed inward in inner blocks 70*a* and 71*a* from the sides of the two inner blocks 70*a* and 71*a* in the tire circumferential direction. In the connecting ribs 140 and 141, between the two rib ends 142, the top face of an intermediate portion 143 disposed between the sides of the two inner blocks 70*a* and 71*a* in the tire circumferential direction is lower than the top faces of the rib ends 142.

As shown in FIG. 12, the top face of the intermediate portion 143 is concave almost like a V-shaped valley in cross section so as to be recessed deeper toward the center of the intermediate portion 143 in the tire circumferential direction. Moreover, a sipe 144 extending in the tire circumferential direction is formed at the center of the connecting ribs 140 and 141 in the tire axial direction.

Furthermore, on the top faces of the inner blocks 70*a* and 71*a* of the inner lands 42*a* and 43*a*, the side ends of the shoulder main grooves 20 and 21 in the intermediate portion in the tire circumferential direction have shallow grooves 152 recessed like triangles when viewed from the outside in the tire radial direction. The shallow grooves 152 decrease in width in the tire circumferential direction toward the shoulder main grooves 20 and 21 connected to the shallow grooves 152.

On the top faces of the inner blocks 70*a* and 71*a*, the distal ends of a first protrusion 80*a* and a second protrusion 83*a* in the intermediate portion in the tire circumferential direction also have shallow grooves 145 recessed like triangles when viewed from the outside in the tire radial direction. The shallow grooves 145 decrease in width in the tire circumferential direction toward the center main groove 22. The top face of the shallow groove 145 does not have a round chamfer that is arc-shaped in cross section but has an edge tilting in the tire circumferential direction or extending in the tire circumferential direction. This can increase traction performance in the tire circumferential direction and enhance the edge effect during cornering of the vehicle.

Furthermore, the ground contacting surfaces of the shoulder blocks 60, 61, 62, and 63 of shoulder lands 41*a* and 44*a* have sipes 146 that are substantially U-shaped when viewed from the outside in the tire radial direction. The sipe 146 is connected to both ends of two shallow grooves 109*a* in the tire axial direction, and one end of the sipe 146 in the tire axial direction is opened to the shoulder main grooves 20 and 21.

Furthermore, sipes 147, 148, and 149 tilting in the tire circumferential direction are formed on the ground contacting surfaces of inner lands 42*a* and 43*a*. The sipes 148 and 149 are connected to the shallow grooves 145, and one end of the sipe 149 is opened to the vicinity of the center of the center main groove 22 in the tire axial direction. In the present example, other configurations and effects are the same as the configuration in FIGS. 1 to 8.

Figure 13:
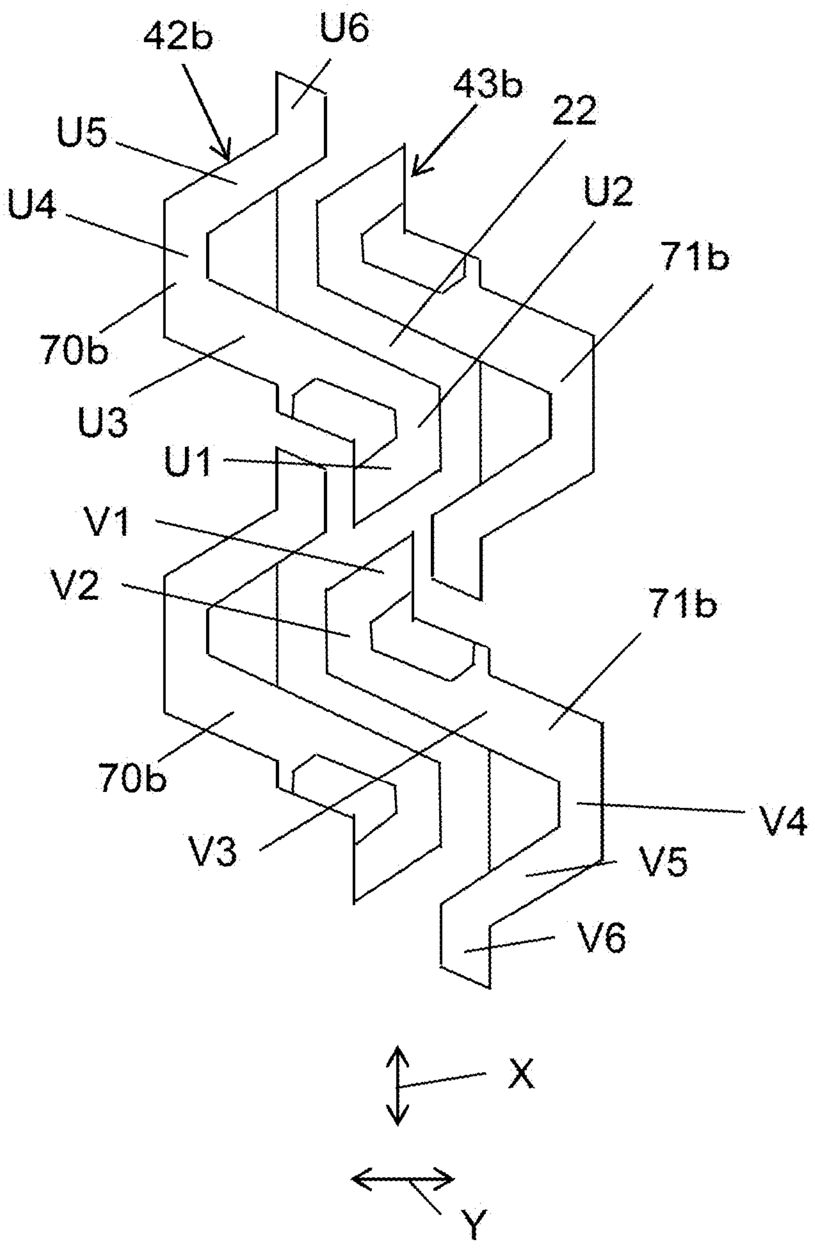
FIG. 13 is a schematic diagram illustrating some blocks of a first inner land and a second inner land in the tire according to another example of the embodiment.

FIG. 13 is a schematic diagram illustrating some blocks of a first inner land 42*b* and a second inner land 43*b* in the tire according to another example of the embodiment. In the foregoing embodiment, a case has been described in which the inner block constituting each inner land has a shape including an inverted letter S. In the configuration of the present example, inner blocks 70*b* and 71*b* are formed into shapes including a letter S. Specifically, the layouts of the circumferential portions U2, U4, and U6 and the tilt portions U1, U3, and U5 of the inner blocks 70 and 71 in the tire circumferential direction in the configuration shown in FIGS. 1 to 8 are inverted in the inner blocks 70*b* and 71*b*. Furthermore, the blocks 70*b* and 71*b* constituting the two inner lands 42*b* and 43*b* are opposed to each other in the tire axial direction, so that the center main groove 22 is formed between the two inner lands 42*b* and 43*b*. In the inner lands 42*b* and 43*b*, the inner blocks 70*b* and 71*b* that are adjacent to each other in the tire circumferential direction are connected via a connecting rib extending in the tire circumferential direction. The connecting rib is not shown in FIG. 13.

Also in the use of the inner blocks 70*b* and 71*b* having the above-mentioned shapes, in the tread, compatibility can be achieved between improvement in the stiffness of the inner lands 42*b* and 43*b* disposed between the pair of shoulder main grooves and improvement in traction performance in the tire circumferential direction and suppression of a decrease in drainage, as in the foregoing examples. In the present example, other configurations and effects are the same as the configuration in FIGS. 1 to 8.

In the foregoing examples, a configuration has been described in which the inner blocks 70, 71, 70*a*, 71*a*, 70*b*, and 71*b* that are adjacent to each other in the tire circumferential direction are connected via the connecting ribs 72, 73, 140, and 141 in the inner lands 42, 43, 42*a*, 43*a*, 42*b*, and 43*b*. The inner lands may be configured such that the inner blocks arranged in the tire circumferential direction are separated by grooves without being connected via connecting ribs along the tire circumferential direction.

In the foregoing description, a case has been described in which on the inner lands 42 and 43, the sipe 85 is formed between the U-shaped ground contacting surface S1 of the first rib 74 and the ground contacting surface S3 at the corner of each of the inner lands 42 and 43, and on the ground contacting surface of each of the inner lands 42 and 43, the sipe 91 is formed between the ground contacting surface of each of the connecting ribs 72 and 73 and each of the inner blocks 70 and 71. In the present invention, a configuration may be adopted in which only the ground contacting surfaces of some of the lands of the tread have the sipes that are formed like thin lines when viewed from the outside in the tire radial direction, and a groove is provided with an end edge at a position within 10 mm of the sipe, the end edge being connected to a round chamfer arc-shaped in cross section. For example, a configuration may be adopted in which the sipe is formed only between the U-shaped ground contacting surface S1 of the first rib 74 and the ground contacting surface S3 at a corner of each of the inner lands 42 and 43, or between the ground contacting surface of each of the connecting ribs 72 and 73 and the top of each of the inner blocks 70 and 71, such that the sipe is shaped like a thin line when viewed from the outside in the tire radial direction, and a groove is provided with an end edge at a position within 10 mm of the sipe, the end edge being connected to a round chamfer arc-shaped in cross section.

The present disclosure will be further described by the following embodiment.

Configuration 1:

A pneumatic tire with a tread including a plurality of grooves and a plurality of lands, wherein the ground contacting surfaces of at least some of the lands have sipes that are formed like thin lines when viewed from the outside in the tire radial direction, and a groove is provided with an end edge at a position within 10 mm of the sipe, the end edge being connected to a round chamfer arc-shaped in cross section.

Configuration 2:

The pneumatic tire according to configuration 1, wherein the wall surface of the groove including the round chamfer is parallel to at least a part of the sipe.

Configuration 3:

The pneumatic tire according to configuration 1 or 2, wherein when viewed from the outside in the tire radial direction, the sipe is U-shaped to surround a portion where the round chamfer of the groove is formed.

Configuration 4:

The pneumatic tire according to any one of configurations 1 to 3, wherein the plurality of grooves includes a main groove, the maximum depth of the sipe is 40% or more of the maximum depth of the main groove, and the sipe is provided so as to separate the lands when viewed from the outside in the tire radial direction.

Configuration 5:

The pneumatic tire according to configuration 4, wherein the land on which the sipe is formed includes a first block having a recessed shape provided on one side of the sipe and a second block that is provided on the other side of the sipe and has an insertion portion located inside the recessed shape of the first block, a shallow groove having a smaller depth than the maximum depth of the main groove is provided on the side where the second block is remote from the sipe, and the round chamfer is formed on the top of the wall surface of the shallow groove.

What is claimed is:

1. A pneumatic tire with a tread including a plurality of grooves and a plurality of lands, wherein ground contacting surfaces of at least some of the lands have a sipe a groove among the plurality of grooves is provided with an end edge at a position within 10 mm of the sipe, the end edge being connected to a round chamfer that is arc-shaped in cross section, the sipe separates the land on which the sipe is formed, the land on which the sipe is formed includes a first block having a recessed shape provided on one side of the sipe and a second block that is provided on the other side of the sipe and has an insertion portion located inside the recessed shape of the first block, the groove is a shallow groove having a smaller depth than a maximum depth of a main groove among the plurality of grooves and is provided on a side of the second block that is remote from the sipe, the land on which the sipe is formed includes two first blocks that are adjacent to each other in a tire circumferential direction, and the second block protrudes outward in the tire radial direction so as to extend in the tire circumferential direction and is connected to the two first blocks while each end of the second block in the tire circumferential direction are placed inward in a corresponding first block from wall surfaces of the two first blocks, the wall surfaces facing the tire circumferential direction, and the second block is a connecting rib including a ground contacting surface provided on an outer surface in the tire radial direction, and the shallow groove is provided inside the ground contacting surface, extends in the tire circumferential direction, and is recessed from the ground contacting surface.

2. The pneumatic tire according to claim 1, wherein a wall surface of the groove including the round chamfer is parallel to at least a part of the sipe.

3. The pneumatic tire according to claim 1, wherein when viewed from outside in the tire radial direction, the sipe is U-shaped to surround a portion where the round chamfer of the groove is formed.

4. The pneumatic tire according to claim 1, wherein ga maximum depth of the sipe is 40% or more of a maximum depth of the main groove.

5. The pneumatic tire according to claim 4, wherein the round chamfer is formed on a top of a wall surface of the shallow groove.

6. The pneumatic tire according to claim 5, wherein the land on which the sipe is formed includes two sipes, another first block being on one side of a second sipe, another second block being on the other side of the second sipe, and another shallow groove being provided on a side of the another second block that is remote from the second sipe, and the another second block is a rib that protrudes outward in the tire radial direction and includes a U-shaped ground contacting surface provided on an outer surface in the tire radial direction, and the another shallow groove is provided inside the ground contacting surface and is recessed from the ground contacting surface.

7. A pneumatic tire with a tread including a plurality of grooves and a plurality of lands, wherein ground contacting surfaces of at least some of the lands have a sipe, a groove among the plurality of grooves is provided with an end edge at a position within 10 mm of the sipe, the end edge being connected to a round chamfer that is arc-shaped in cross section, the sipe separates the land on which the sipe is formed, the land on which the sipe is formed includes a first block having a recessed shape provided on one side of the sipe and a second block that is provided on the other side of the sipe and has an insertion portion located inside the recessed shape of the first block, the groove is a shallow groove having a smaller depth than a maximum depth of a main groove among the plurality of grooves and is provided on a side of the second block that is remote from the sipe, the second block is a rib that protrudes outward in the tire radial direction and includes a U-shaped ground contacting surface provided on an outer surface in the tire radial direction, and the shallow groove is provided inside the ground contacting surface and recessed from the ground contacting surface, the plurality of grooves include a V-shaped groove broadening on both sides of a tire circumferential direction toward one side of a tire axial direction, the V-shaped groove includes two inclined grooves which are respectively disposed on both sides, in the tire circumferential direction, of the V-shaped groove and respectively inclined toward opposite sides of the tire circumferential direction, and a circumferential groove for connecting the two inclined grooves, the circumferential groove extending along the tire circumferential direction, and the second block is connected to the circumferential groove with the shallow groove being opened to the circumferential groove, and a wall surface of the shallow groove and the sipe are formed in a shape broadening toward a connection side of the main groove.

* * * * *